(12) United States Patent
Beard et al.

(10) Patent No.: US 12,143,757 B2
(45) Date of Patent: Nov. 12, 2024

(54) CABLE FREE NETWORKING DEVICE STACKING SYSTEM

(71) Applicant: Dell Products L.P., Round Rock, TX (US)

(72) Inventors: Neal Beard, Austin, TX (US); Shree Rathinasamy, Round Rock, TX (US); Joe Shahram Ghalam, Greenbrae, CA (US)

(73) Assignee: Dell Products L.P., Round Rock, TX (US)

(*) Notice: Subject to any disclaimer, the term of this patent is extended or adjusted under 35 U.S.C. 154(b) by 113 days.

(21) Appl. No.: 17/989,744

(22) Filed: Nov. 18, 2022

(65) Prior Publication Data

US 2024/0171888 A1 May 23, 2024

(51) Int. Cl.
| | |
|---|---|
| *H04B 10/114* | (2013.01) |
| *H04B 10/11* | (2013.01) |
| *H04Q 11/00* | (2006.01) |

(52) U.S. Cl.
CPC ......... *H04Q 11/0005* (2013.01); *H04B 10/11* (2013.01); *H04Q 2011/0052* (2013.01)

(58) Field of Classification Search
CPC .................................................. H04B 10/114
See application file for complete search history.

(56) References Cited

U.S. PATENT DOCUMENTS

| | | | |
|---|---|---|---|
| 2011/0243074 A1* | 10/2011 | Shin | H04L 41/12 398/118 |
| 2021/0117515 A1* | 4/2021 | Bartfai-Walcott | G06F 21/105 |
| 2024/0146500 A1* | 5/2024 | Krishnamurthy | H04L 7/0029 |

OTHER PUBLICATIONS

S. Arnon, "Next-generation optical wireless communications for data centers", Proc. Of SPIE vol. 9387, 2015 (Year: 2015).*
"Introduction of Light Fidelity (Li-Fi)", GeeksforGeeks, Jul. 2022 (Year: 2022).*

* cited by examiner

*Primary Examiner* — Shi K Li
(74) *Attorney, Agent, or Firm* — Joseph Mencher

(57) ABSTRACT

A cable free networking device stacking system includes networking devices that are each configured to operate as part of a networking device stack, and at least one LiFi device included on each of the networking devices. A first LiFi device on a first networking device in the plurality of networking devices transmits networking device stack data communications by receiving first electrical data communications from the first networking device, converting the first electrical data communications to first optical data communications, and wirelessly transmitting the first optical data communications to a second LiFi device included on a second networking device in the plurality of networking devices. The first LiFi device also receives networking device stack data communications by wirelessly receiving second optical data communications from the second LiFi device, converting the second optical data communications to second electrical data communications, and transmitting the second electrical data communications to the first networking device.

20 Claims, 19 Drawing Sheets

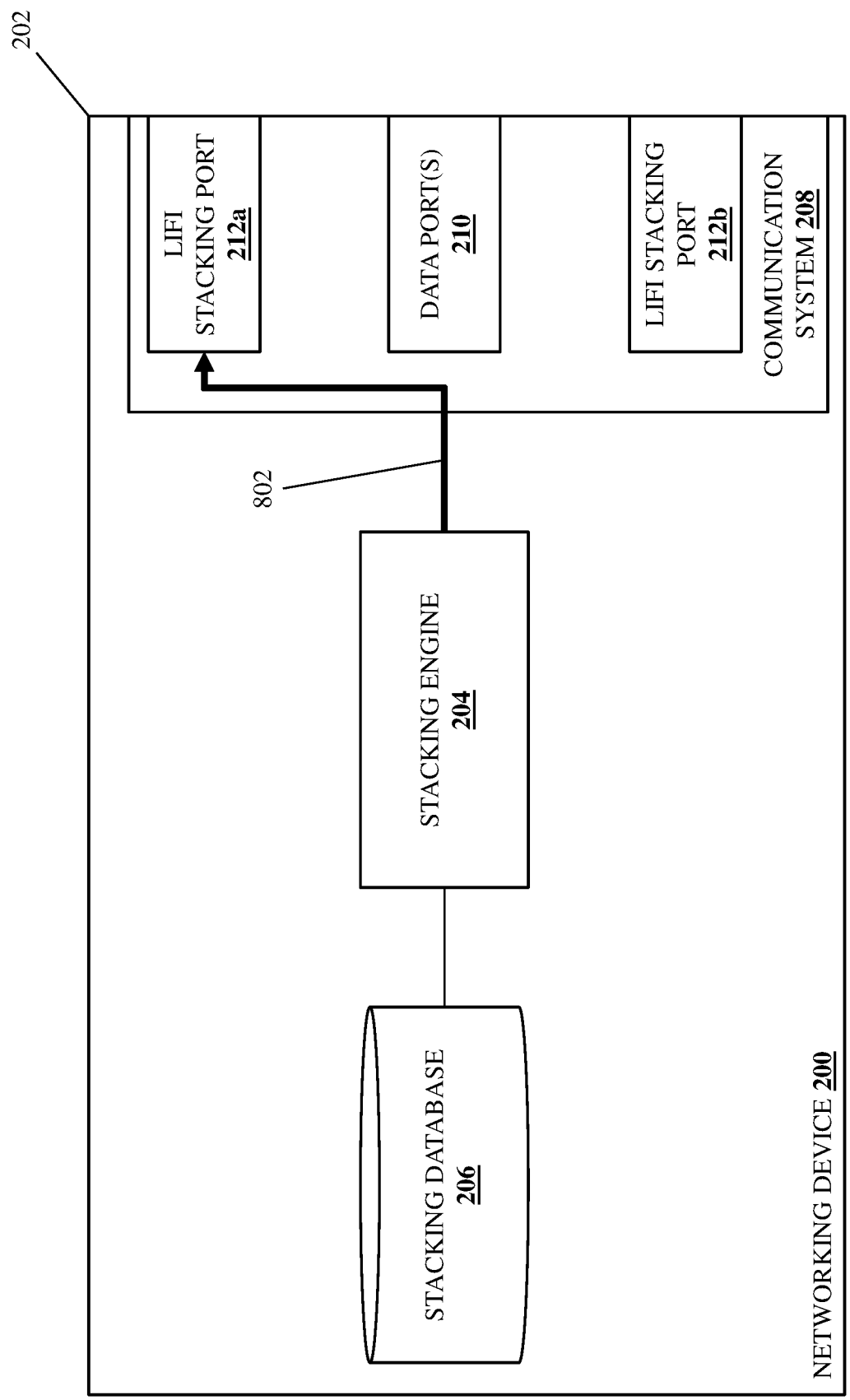

CABLE FREE NETWORKING DEVICE STACKING SYSTEM

BACKGROUND

The present disclosure relates generally to information handling systems, and more particularly to stacking networking information handling systems without the use of cables.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices such as switch devices, are sometimes configured in networking device "stacks" that include a plurality of networking devices that are connected together and configured to operate as an integrated networking device that may be managed via a single Internet Protocol (IP) address and single management console session. For example, conventional Ethernet switch stacking solutions allow up to 12 switch devices to be configured as part of a switch stack, and may reduce the points of administration for those switch devices via the designation of a primary/management switch device from those switch devices that operates to provide a user interface and switching software, and propagates changes to the other switch devices in the switch stack. However, the conventional configuration of networking devices in a networking device stack raises issues.

For example, the conventional Ethernet switch stacking solutions discussed above require proprietary stacking cables that must be connected to proprietary and dedicated stacking ports on the switch devices in the switch stack in a particular "ring" topology that allows all of the switch devices in the switch stack to communicate with each other even in the event one of the switch devices in the switch stack (e.g., a switch device in the "middle" of the switch stack) fails or otherwise becomes unavailable, and in the event the ring topology discussed above is not properly provided and a switch device in the switch stack fails or otherwise becomes unavailable, the switch stack may "split" into multiple independent switch stacks. As will be appreciated by one of skill in the art in possession of the present disclosure, networking device stacking can be difficult to understand and often results in support calls to the networking device provider, while also being relatively difficult to troubleshoot and often requiring support personnel to acquire multiple stacking cables and/or networking device(s) to perform such troubleshooting.

Furthermore, stacking cables are relatively bulky and difficult to connect between networking devices, and can hinder cooling of the networking devices and/or access to cooling systems (e.g., fans) and power systems (e.g., Power Supply Units (PSUs)) in the networking devices, particularly when cable management best practices are not followed. Further still, different networking devices utilize different types of stacking ports and stacking cables that may be unique to the hardware platform that provides those networking devices, which can lead to spare part proliferation (e.g., in order to ensure all hardware platforms have the correct stacking cables when parts are being dispatched to customers), as well as the dispatching of incorrect stacking cables to customers.

Accordingly, it would be desirable to provide a networking device stacking system that addresses the issues discussed above.

SUMMARY

According to one embodiment, an Information Handling System (IHS) includes a networking processing system; and a networking memory system that is coupled to the networking processing system and that includes instructions that, when executed by the networking processing system, cause the networking processing system to provide a networking engine that is configured to operate as part of a networking device stack, wherein the networking engine configured to: receive, from a computing device that is coupled to the networking processing system, first electrical data communications; and transmit the first electrical data communications as part of networking device stack communication operations; and a LiFi processing system; and a LiFi memory system that is coupled to the LiFi processing system and that includes instructions that, when executed by the LiFi processing system, cause the LiFi processing system to provide a LiFi engine that is configured to transmit networking device stack data communications by: receiving the first electrical data communications transmitted by the networking engine; converting the first electrical data communications to first optical data communications; and wirelessly transmitting the first optical data communications to a second LiFi device included on a second networking device that is configured to operate as part of the networking device stack.

BRIEF DESCRIPTION OF THE DRAWINGS

FIG. 8B is a schematic view illustrating an embodiment of the networking device of FIGS. 2A and 2B operating during the method of FIG. 4.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smartphone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, a touchscreen and/or a video display. The information handling system may also include one or more buses operable to transmit communications between the various hardware components.

Figure 1:
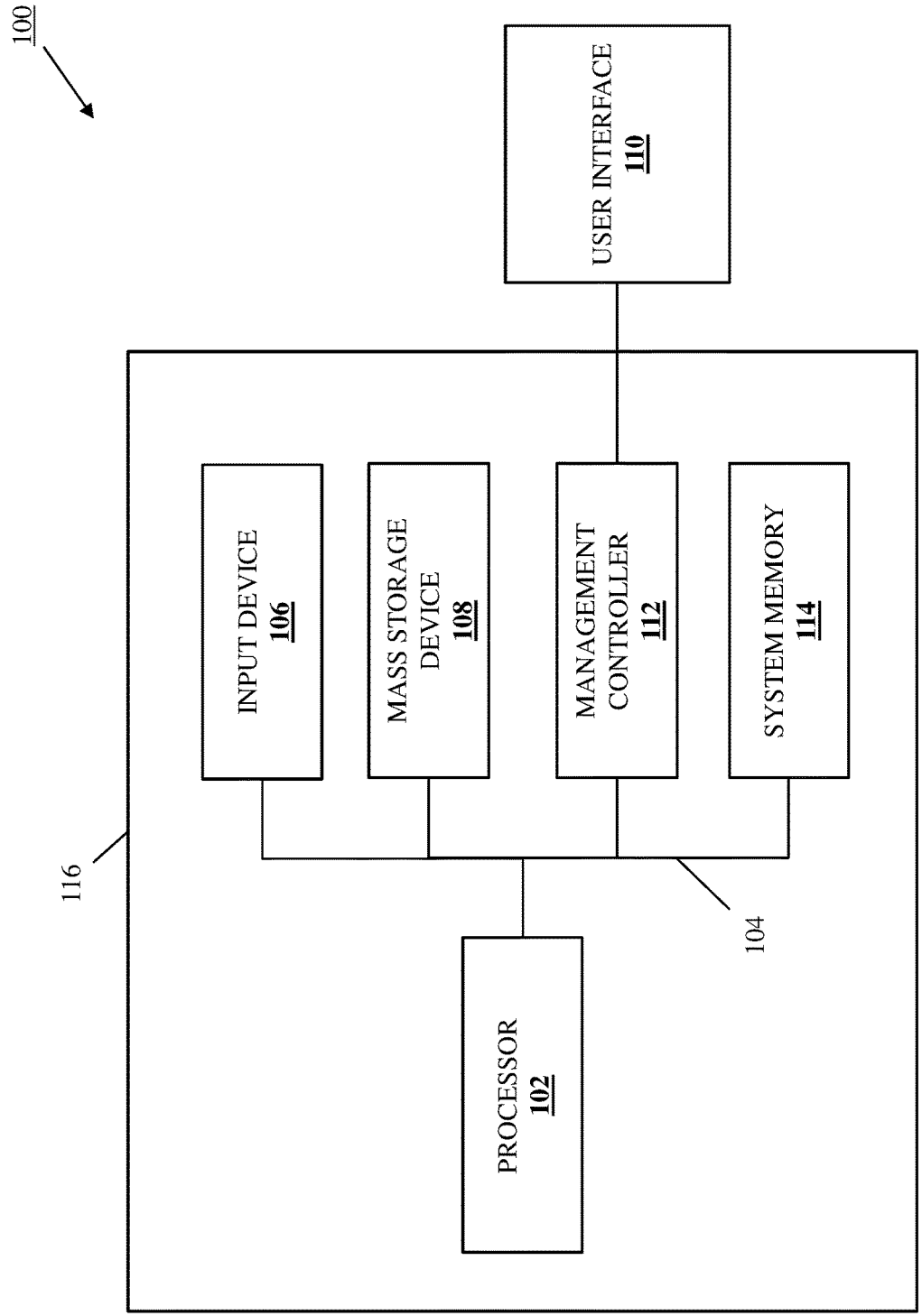
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a user interface 110, which is coupled to processor 102 by a management controller 112. A system memory 114 is coupled to processor 102 to provide the processor with fast storage to facilitate the execution of computer programs by processor 102. Examples of system memory may include random access memory (RAM) devices such as dynamic RAM (DRAM), synchronous DRAM (SDRAM), solid-state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
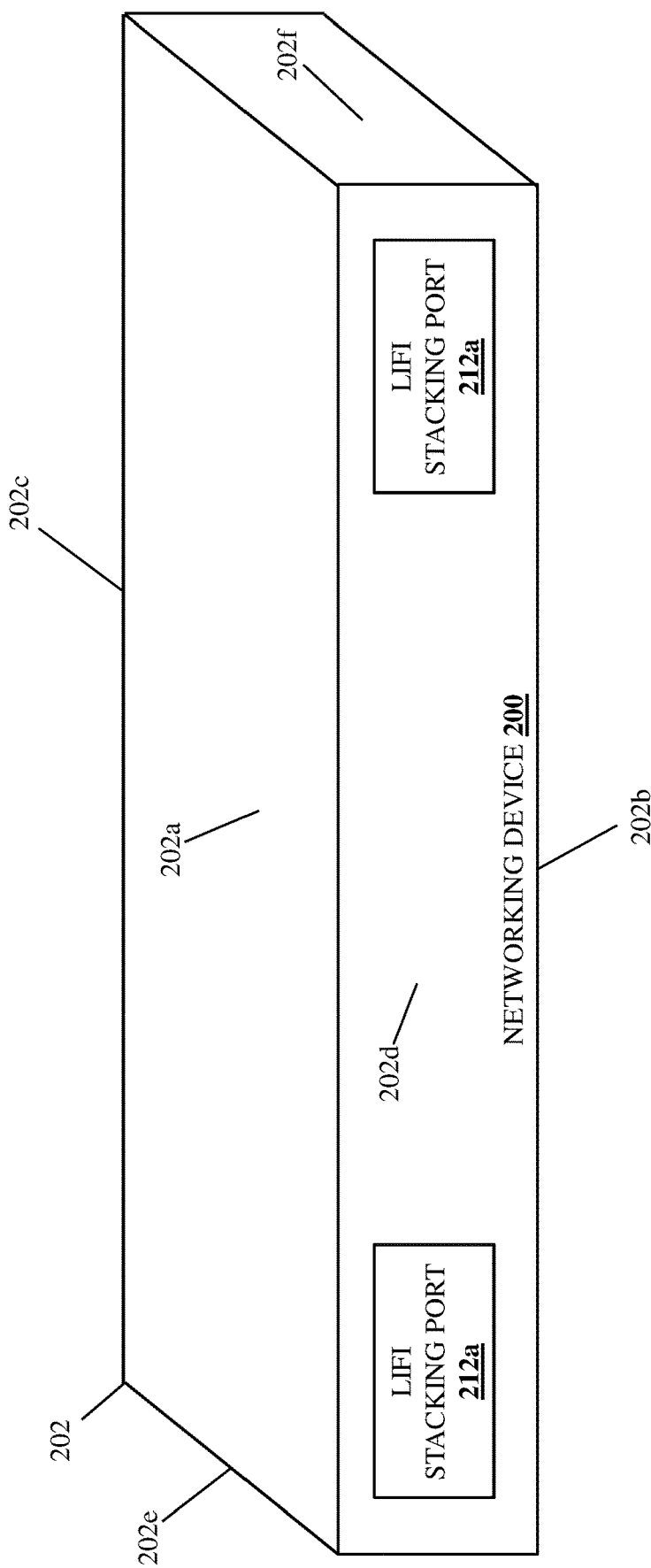
FIG. 2A is a perspective view illustrating an embodiment of a networking device that may be included in the cable free networking device stacking system of the present disclosure.
Figure 2B:
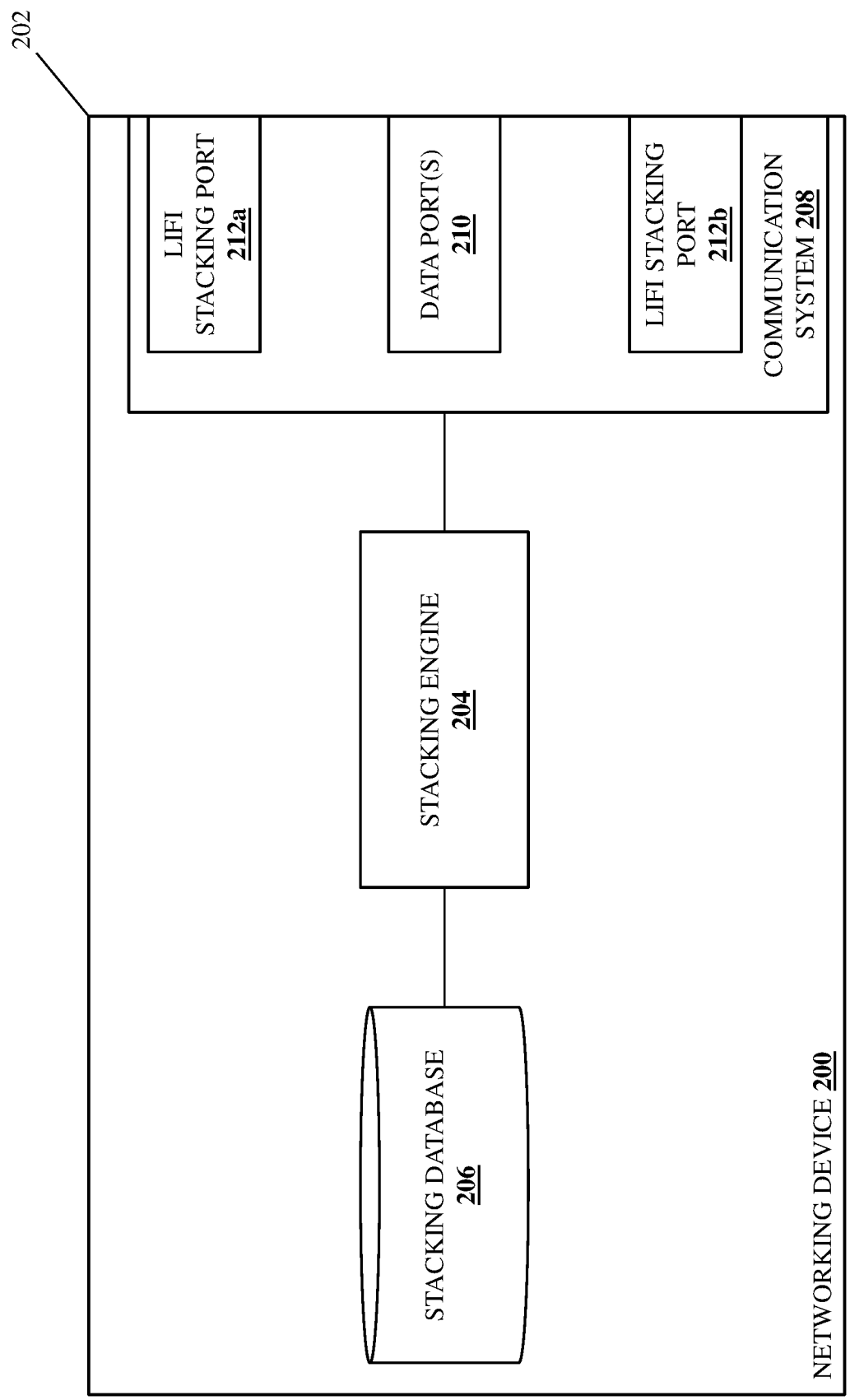
FIG. 2B is a schematic view illustrating an embodiment of the networking device of FIG. 2A.

Referring now to FIGS. 2A and 2B, an embodiment of a networking device 200 is illustrated that may be utilized in the cable-free networking device stacking system of the present disclosure. In the illustrated embodiment, the networking device 200 may be provided by the IHS 100 discussed above with reference to FIG. 1, and/or may include some or all of the components of the IHS 100, and in a specific example may be provided by a switch device. However, while illustrated and discussed as being provided by a switch device, one of skill in the art in possession of the present disclosure will recognize that networking devices utilized in the cable-free networking device stacking system of the present disclosure may include any devices that may be configured to operate similarly as the networking device 200 discussed below. As illustrated, the networking device 200 may include a chassis 202 that includes a top surface 202*a*, a bottom surface 202*a* that is located opposite the chassis 202 from the top surface 202*a*, a front surface 202*c* that extends between the top surface 202*a* and the bottom surface 202*b*, a rear surface 202*d* that is located opposite the chassis 202 from the front surface 202*c* and that extends between the top surface 202*a* and the bottom surface 202*b*, and a pair of opposing sides surfaces 202*e* and 202*f* that are located opposite the chassis 202 from each other and that extend between the top surface 202*a*, the bottom surface 202*b*, the front surface 202*c*, and the rear surface 202*d*.

In the illustrated embodiment, the chassis 202 of the networking device 200 houses the components of the networking device 200, only some of which are illustrated and described below. For example, the chassis 202 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a stacking engine 204 that is configured to perform the functionality of the stacking engines and/or networking devices discussed below. The chassis 202 may also house a storage system (not illustrated, but which may include the storage 108 discussed above with reference to FIG. 1) that is coupled to the stacking engine 204 (e.g., via a coupling between the storage system and the processing system) and that includes a stacking database 206 that is configured to store any of the information utilized by the stacking engine 204 discussed below.

The chassis 202 may also house a communication system 208 that is coupled to the stacking engine 204 (e.g., via a coupling between the communication system 208 and the processing system) and that may be provided by any of a variety of networking communication components (e.g., switch components) that would be apparent to one of skill in the art in possession of the present disclosure. In the specific example illustrated in FIGS. 2A and 2B, the communication system 208 includes one or more data ports 210 that, while not visible in FIG. 2A, may be accessible via the front surface 202c on the chassis 202 of the networking device 200, as well as a plurality of LiFi stacking ports 212a and 212b that are accessible via the rear surface 202d on the chassis 202 of the networking device 200. In a specific embodiment, the LiFi stacking ports 212a and 212b may be provided by transceiver ports (e.g., Quad Small Form-factor Pluggable (QSFP) transceiver ports), although one of skill in the art in possession of the present disclosure will recognize that the stacking ports 212a and 212b may be provided using other port technologies while remaining within the scope of the present disclosure as well. Furthermore, while a specific networking device 200 has been illustrated and described, one of skill in the art in possession of the present disclosure will recognize that networking devices (or other devices operating according to the teachings of the present disclosure in a manner similar to that described below for the networking device 200) may include a variety of components and/or component configurations for providing conventional networking device functionality, as well as the functionality discussed below, while remaining within the scope of the present disclosure as well.

Figure 3:
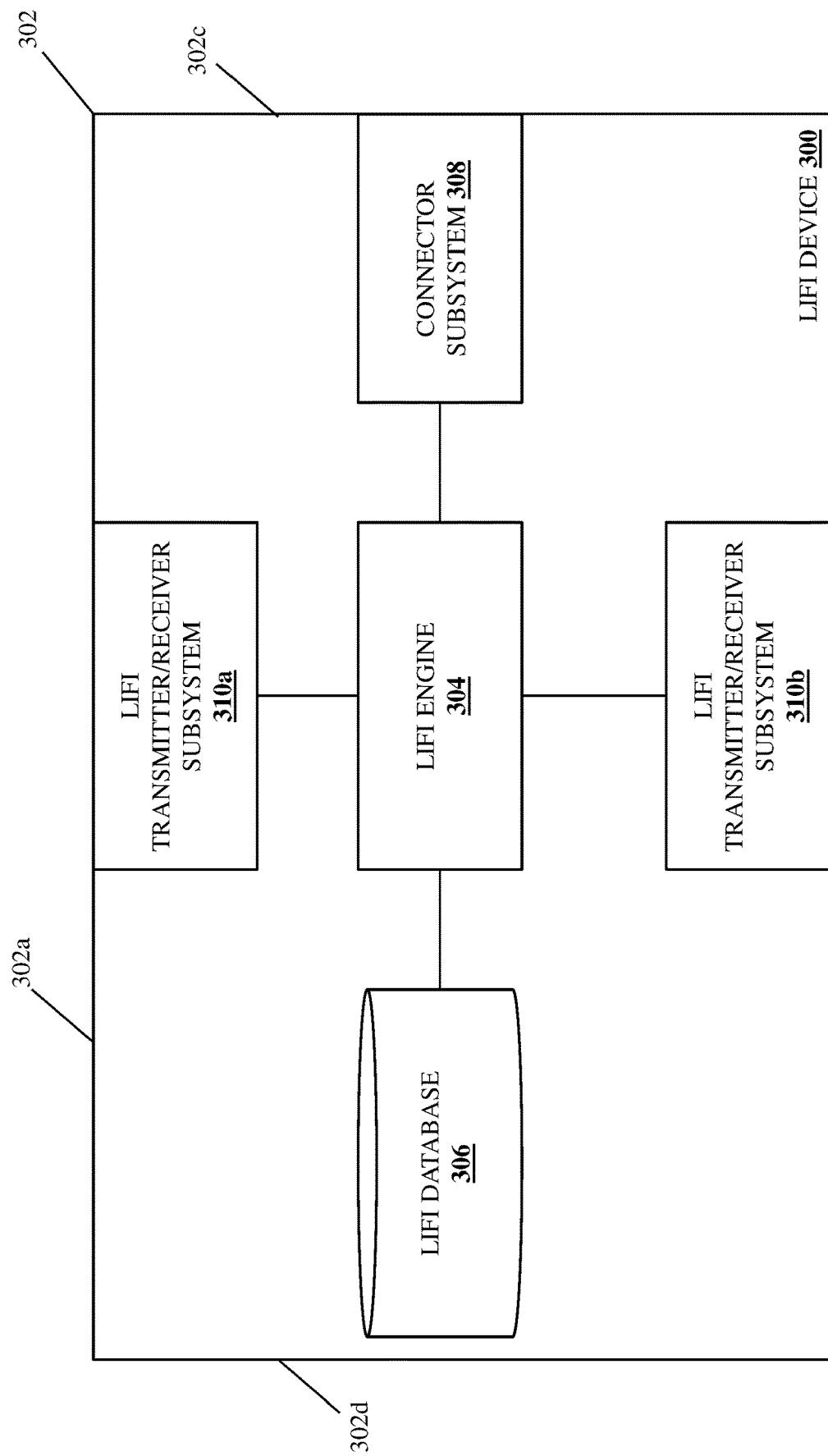
FIG. 3 is a schematic view illustrating an embodiment of a LiFi device that may be included in the cable free networking device stacking system of the present disclosure.

Referring now to FIG. 3, an embodiment of a LiFi device 300 is illustrated that may be utilized with the networking device 200 of FIGS. 2A and 2B in the cable-free networking device stacking system of the present disclosure. In an embodiment, the LiFi device 300 may be provided by the IHS 100 discussed above with reference to FIG. 1 and/or may include some or all of the components of the IHS 100, and in specific examples may be provided by any of a variety of LiFi subsystems that may be provided in transceiver device form factor (e.g., a QSFP transceiver device form factor). However, while illustrated and discussed as being provided in a transceiver device form factor, one of skill in the art in possession of the present disclosure will recognize that the functionality of the LiFi device 300 discussed below may be provided via other form factors that are configured to operate similarly as the LiFi device 300 discussed below. In the illustrated embodiment, the LiFi device 300 includes a chassis 302 having a top surface 302a, a bottom surface 302a that is located opposite the chassis 302 from the top surface 302a, a front surface 302c that extends between the top surface 302a and the bottom surface 302b, a rear surface 302d that is located opposite the chassis 302 from the front surface 302c and that extends between the top surface 302a and the bottom surface 302b, and a pair of opposing sides surfaces (not visible in FIG. 3) that are located opposite the chassis 302 from each other and that extend between the top surface 302a, the bottom surface 302b, the front surface 302c, and the rear surface 302d The chassis 302 may house the components of the LiFi device 300, only some of which are illustrated and discussed below. As illustrated, the chassis 302 may house a processing system (not illustrated, but which may be similar to the processor 102 discussed above with reference to FIG. 1) and a memory system (not illustrated, but which may be similar to the memory 114 discussed above with reference to FIG. 1) that is coupled to the processing system and that includes instructions that, when executed by the processing system, cause the processing system to provide a LiFi engine 304 that is configured to perform the functionality of the LiFi engines and/or LiFi devices discussed below. While not illustrated of discussed in detail, one of skill in the art in possession of the present disclosure will appreciate how the LiFi engine 304 may include hardware, software, and/or firmware that is configured to receive electrical data communications, perform analog-to-digital conversions, and/or perform other LiFi functionality that would be apparent to one of skill in the art in possession of the present disclosure.

The chassis 302 may also house a storage system (not illustrated, but which may include the storage 108 discussed above with reference to FIG. 1) that is coupled to the LiFi engine 304 (e.g., via a coupling between the storage system and the processing system) and that includes a LiFi database 306 that is configured to store any of the information utilized by the LiFi engine 304 discussed below. In the illustrated embodiment, a connector subsystem 308 is included on the front surface 302c of the chassis 302, is coupled to the LiFi engine 304 (e.g., via a coupling between the communication subsystem 308 and the processing system) and, in specific examples, may be provided by a transceiver connector and/or any other connector components that would be apparent to one of skill in the art in possession of the present disclosure.

In the illustrated embodiment, a pair of LiFi transmitter/receiver subsystems 310a and 310b are included in the chassis 302. As illustrated, the LiFi transmitter/receiver subsystem 310a is accessible on the top surface 302a of the chassis 302 and is coupled to the LiFi engine 304 (e.g., via a coupling between the LiFi transmitter/receiver subsystem 310a and the processing system), and the LiFi transmitter/receiver subsystem 310b is accessible on the bottom surface 302b of the chassis 302 and is coupled to the LiFi engine 304 (e.g., via a coupling between the LiFi transmitter/receiver subsystem 310b and the processing system). In a specific example, the LiFi transmitter/receiver subsystems 310a and 310b may each include a laser LiFi transmitter and a laser LiFi receiver, although embodiments including other LiFi transmitter/receiver technologies (e.g., LiFi Light Emitting Device (LED) transmitters and receivers) will fall within the scope of the present disclosure as well. However, while a LiFi device including multiple LiFi transmitter/receiver subsystems located on opposite sides of its chassis has been illustrated and described, one of skill in the art in possession of the present disclosure will recognize how LiFi devices with a single LiFi transmitter/receiver subsystem or additional LiFi transmitter/receiver subsystem(s) will fall within the scope of the present disclosure as well.

Furthermore, while a specific LiFi device 300 has been illustrated and described, one of skill in the art in possession of the present disclosure will recognize that LiFi devices (or other devices operating according to the teachings of the present disclosure in a manner similar to that described below for the LiFi device 300) may include a variety of components and/or component configurations for providing conventional LiFi device functionality, as well as the functionality discussed below, while remaining within the scope of the present disclosure as well. For example, the LiFi device 300 may include a rotatable coupling between the connector subsystem 308 and the LiFi transmitter/receiver subsystems 310*a* and 310*b* in order to allow the orientation of the LiFi transmitter/receiver subsystems 310*a* and 310*b* relative to the connector subsystem 310 to be adjusted when the connector subsystem 308 is connected to a networking device as discussed in further detail below, which one of skill in the art in possession of the present disclosure will appreciate may enable the functionality discussed below while allowing different networking device stacking configurations/relatively orientations of the networking devices.

Figure 4:
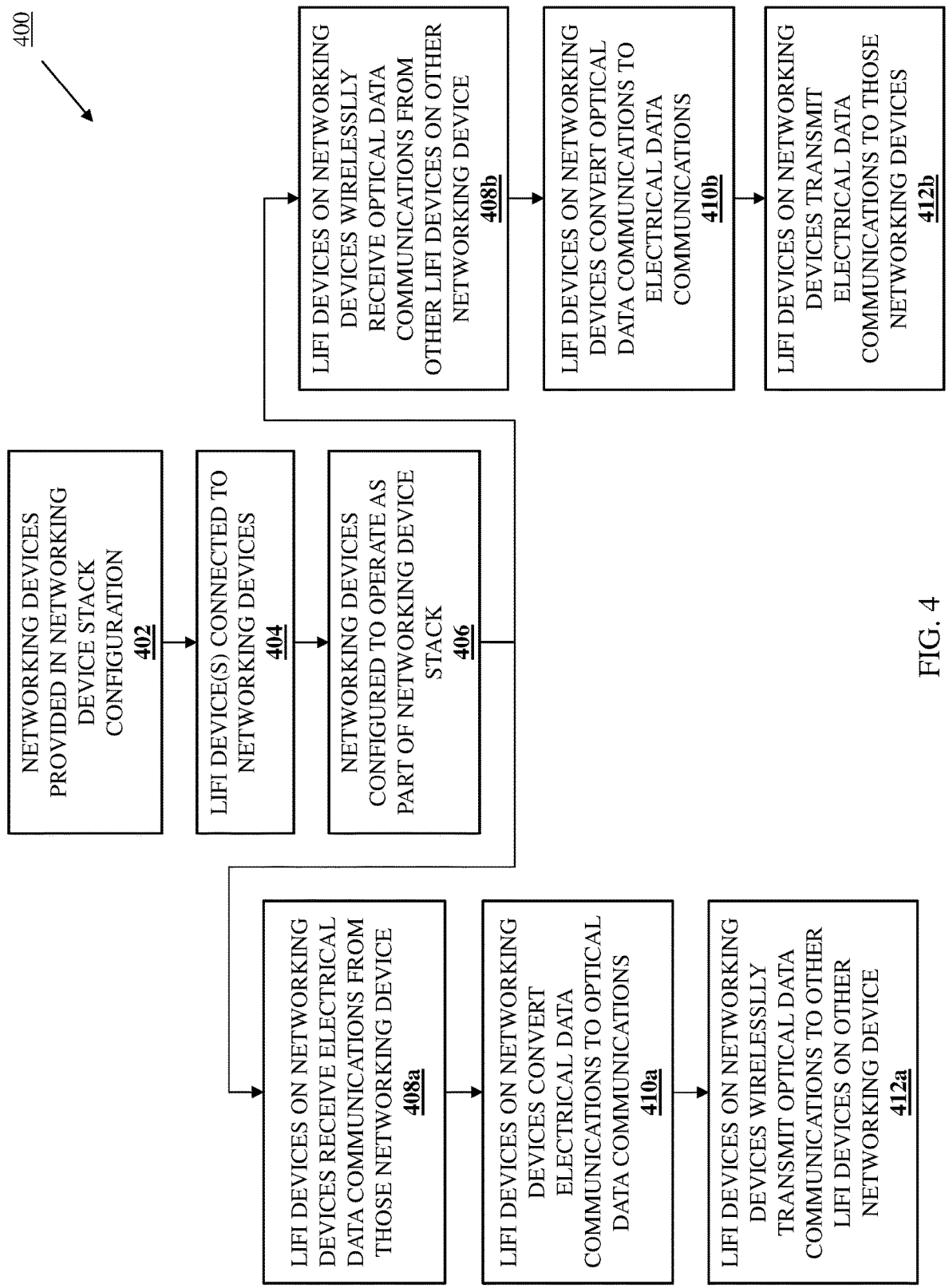
FIG. 4 is a flow chart illustrating an embodiment of a method for stacking networking devices without the use of cables.

Referring now to FIG. 4, an embodiment of a method 400 for stacking networking devices without the use of cables is illustrated. As discussed below, the systems and methods of the present disclosure provide for the exchange of networking device stack data communications between networking devices in a networking device stack via the use of LiFi devices that transmit those networking device stack data communications using light and without the need for cables. For example, the cable free networking device stacking system of the present disclosure may include networking devices that are each configured to operate as part of a networking device stack, and at least one LiFi device included on each of the networking devices. A first LiFi device on a first networking device in the plurality of networking devices transmits networking device stack data communications by receiving first electrical data communications from the first networking device, converting the first electrical data communications to first optical data communications, and wirelessly transmitting the first optical data communications to a second LiFi device included on a second networking device in the plurality of networking devices. The first LiFi device also receives networking device stack data communications by wirelessly receiving second optical data communications from the second LiFi device, converting the second optical data communications to second electrical data communications, and transmitting the second electrical data communications to the first networking device. As such, issues with conventional cabled networking device stacking systems are eliminated.

Figure 5:
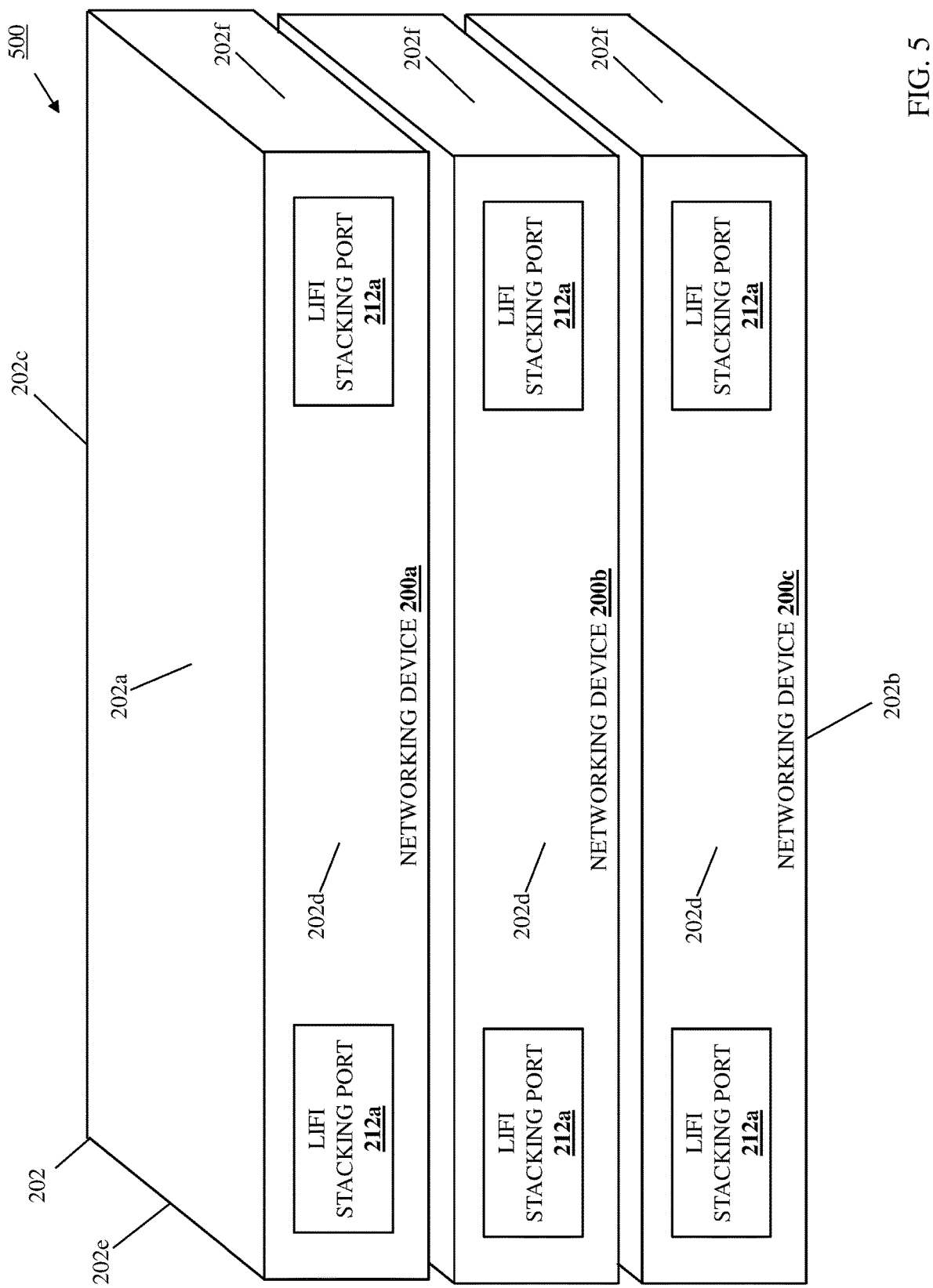
FIG. 5 is a perspective view illustrating an embodiment of a plurality of the networking device of FIGS. 2A and 2B provided in a networking device stack configuration during the method of FIG. 4.

The method 400 begins at block 402 where networking devices are provided in a networking device stack configuration. With reference to FIG. 5, in an embodiment of block 402, a plurality of the networking devices 200 discussed above with reference to FIG. 2 may be provided in a networking device stack configuration 500 via direct engagement of the networking devices, in a rack that supports the networking devices, and/or using other networking device stack configuration techniques that would be apparent to one of skill in the art in possession of the present disclosure. In the illustrated embodiment, the networking device stack configuration 500 includes a "first" networking device 200*a* provided in a "top" networking device stack position, a "second" networking device 200*b* provided in an "middle" networking device stack position, and a "third" networking device 200*c* provided in a "bottom" networking device stack position.

However, as will be appreciated by one of skill in the art in possession of the present disclosure, the embodiment illustrated and described below that includes three networking devices in a networking device stack configuration is provided as a simplified example of a networking device stack, and that additional networking devices may be provided in the networking device stack (e.g., as additional networking devices in "middle" networking device stack positions between the first networking device 200*a* provided in the "top" networking device stack position and the third networking device 200*c* provided in the "bottom" networking device stack position) while remaining within the scope of the present disclosure. For example, as discussed above, conventional Ethernet switch stacking solutions allow up to 12 switch devices to be configured, and one of skill in the art in possession of the present disclosure will appreciated how any additional networking devices may be added to the networking device stack configuration 500 and wirelessly communicatively coupled to their adjacent networking devices similarly as described for the networking device 200*b* below.

Figure 6:
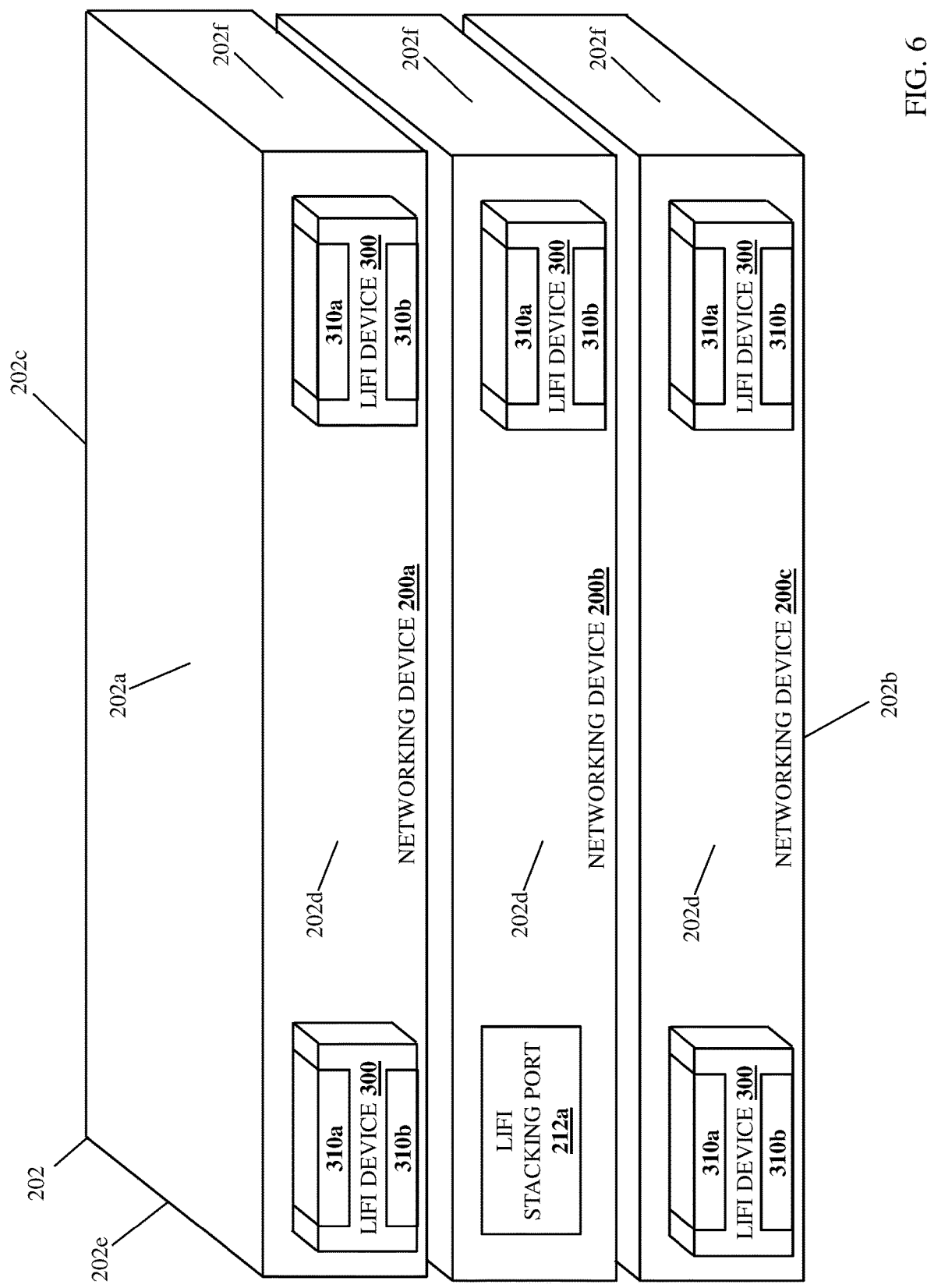
FIG. 6 is a perspective view illustrating an embodiment of a plurality of the LiFi device of FIG. 3 connected to the networking devices in the networking device stack configuration of FIG. 5 during the method of FIG. 4.

The method 400 then proceeds to block 404 where one or more LiFi devices are connected to each of the networking devices. With reference to FIG. 6, in an embodiment of block 404, one or more of the LiFi devices 300 discussed above with reference to FIG. 3 may be connected to each of the networking devices 200*a*, 200*b*, and 200*c* in the networking device stack configuration 500. In the specific example illustrated in FIG. 6, a respective LiFi device 300 is connected to each of the LiFi stacking ports 212*a* and 212*b* on the first networking device 200*a*. However, while each of the LiFi devices 300 connected to the first networking device 200*a* are illustrated as including the pair of LiFi transmitter/receiver subsystems 310*a* and 310*b* located on opposites sides of its chassis 302, one of skill in the art in possession of the present disclosure will appreciate how LiFi devices with only a single LiFi transmitter/receiver subsystem (e.g., the LiFi transmitter/receiver subsystem 310*b*) may be connected to the first networking device 200*a* in embodiments where such LiFi devices are utilized/available.

Furthermore, a respective LiFi device 300 is connected to each of the LiFi stacking port 212*a* and 212*b* on the third networking device 200*c*. However, while each of the LiFi devices 300 connected to the third networking device 200*c* are illustrated as including the pair of LiFi transmitter/receiver subsystems 310*a* and 310*b* on opposites sides of its chassis 302, one of skill in the art in possession of the present disclosure will appreciate how LiFi devices with only a single LiFi transmitter/receiver subsystem (e.g., the LiFi transmitter/receiver subsystem 310*a*) may be connected to the third networking device 200*c* in embodiments where such LiFi devices are utilized/available. Further still, a LiFi device 300 is connected to the LiFi stacking port 212*b* on the second networking device 200*b*, while the LiFi stacking port 212*a* is kept free of a LiFi device 212*a* in order to ensure the ability to perform LiFi data transmissions between the LiFi device 300 connected to the LiFi stacking port 212*a* on the first networking device 200*a* and the LiFi device 300 connected to the LiFi stacking port 212*a* on the third networking device 200*c*, as illustrated and described in further detail below.

However, while specific examples of the connection of the LiFi devices 300 to the networking devices 200*a*, 200*b*, and 200*c* have been described, one of skill in the art in possession of the present disclosure will appreciate how the LiFi devices 300 may be configured in other manners during block 404 to enable the functionality discussed below. For example, a rotatable coupling between the connector subsystem 308 and the LiFi transmitter/receiver subsystems 310*a* and 310*b* may be utilized to adjust the orientation of the LiFi transmitter/receiver subsystems 310*a* and/or 310*b* relative to their connected networking device in order to, for example, enable the functionality discussed below while allowing different relative positioning of the networking devices 200*a*, 200*b*, and/or 200*c* in different networking device stack configurations. Furthermore, while the LiFi devices 300 are illustrated and described as being connected to (and disconnectable from) the networking devices 200a, 200b, and 200c, one of skill in the art in possession of the present disclosure will appreciate how the networking devices 200a, 200b, and 200c may include the LiFi devices 300 as illustrated in FIG. 6 integrated as part of their chassis 202 while remaining within the scope of the present disclosure as well.

The method 400 then proceeds to block 406 where the networking devices are configured to operate as part of a networking device stack. In some embodiments, at block 406, the networking devices 200a, 200b, and 200c in the networking device stack configuration 500 may be configured to operate as part of a networking device stack using conventional techniques. For example, a network administrator or other user may configure one of the networking devices 200a, 200b, or 200c as a "primary"/management networking device that may subsequently operate to provide a user interface and switching software, propagates changes to the other networking devices in the networking device stack, and/or perform other networking device stack primary/management functionality that would be apparent to one of skill in the art in possession of the present disclosure. In addition, the network administrator or other user may configure one of the networking devices 200a, 200b, or 200c as a "stand-by" networking device that may be configured to take over primary/management functionality for the networking device stack in the event the primary/management networking device fails or otherwise becomes unavailable. However, while a few specific conventional networking device stack configuration operations have been described, one of skill in the art in possession of the present disclosure will appreciate how other conventional networking device stack configuration operations will fall within the scope of the present disclosure as well.

Some embodiments of the present disclosure provide for the automated configuration of the networking devices 200a, 200b, and 200c to operate as part of a networking device stack at block 406. For example, following the provisioning of the networking device 200a, 200b, and 200c in the networking device stack configuration 500 as illustrated in FIG. 5 and the connection of the LiFi devices 300 to those networking devices 200a-200c as illustrated in FIG. 6, the network administrator or other user may power on, reset, and/or otherwise initialize the networking devices 200a-200c such that those networking devices 200a-200c may exchange networking device stack configuration communications (e.g., according to a stacking protocol that would be apparent to one of skill in the art in possession of the present disclosure) in order to provide for the automated configuration of the networking devices 200a, 200b, and 200c to operate as part of a networking device stack.

Figure 7A:
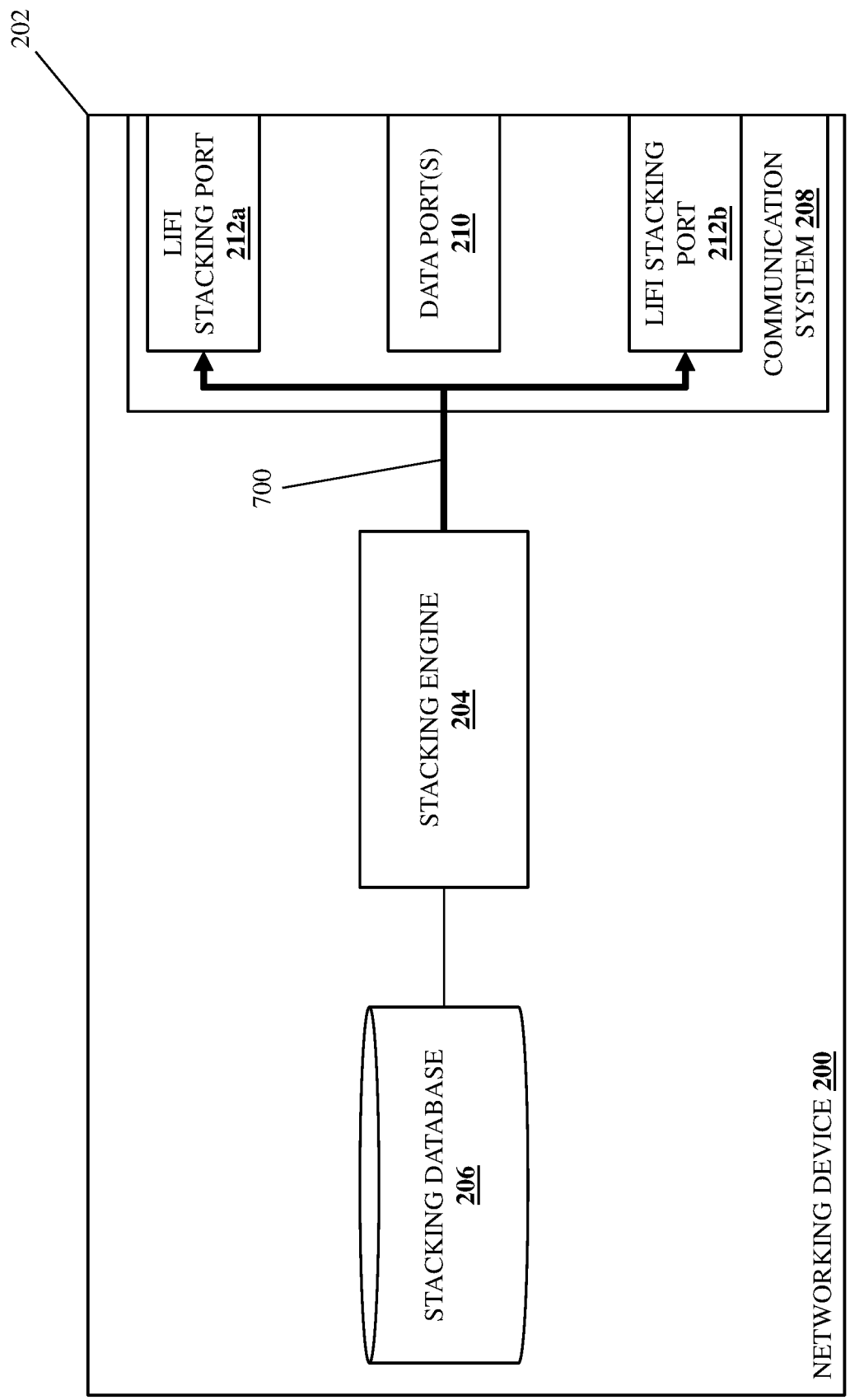
FIG. 7A is a schematic view illustrating an embodiment of the networking device of FIGS. 2A and 2B operating during the method of FIG. 4.

To provide an example of the transmission of networking device stack configuration communications as part of the automated configuration of the networking devices 200a, 200b, and 200c to operate as part of a networking device stack, with reference to FIG. 7A, the stacking engine 204 in the networking devices 200 (e.g., any for the networking devices 200a, 200b, and/or 200c) may perform networking device stack configuration communication transmission operations 700 that include transmitting networking device stack configuration communications via either or both of the LiFi stacking ports 212a and 212b on that networking device 200. As will be appreciated by one of skill in the art in possession of the present disclosure, the networking device stack configuration communications transmitted by the networking devices 200 may be analog electrical data communications that include any information that allows for the automated networking device stack configuration discussed below.

Figure 7B:
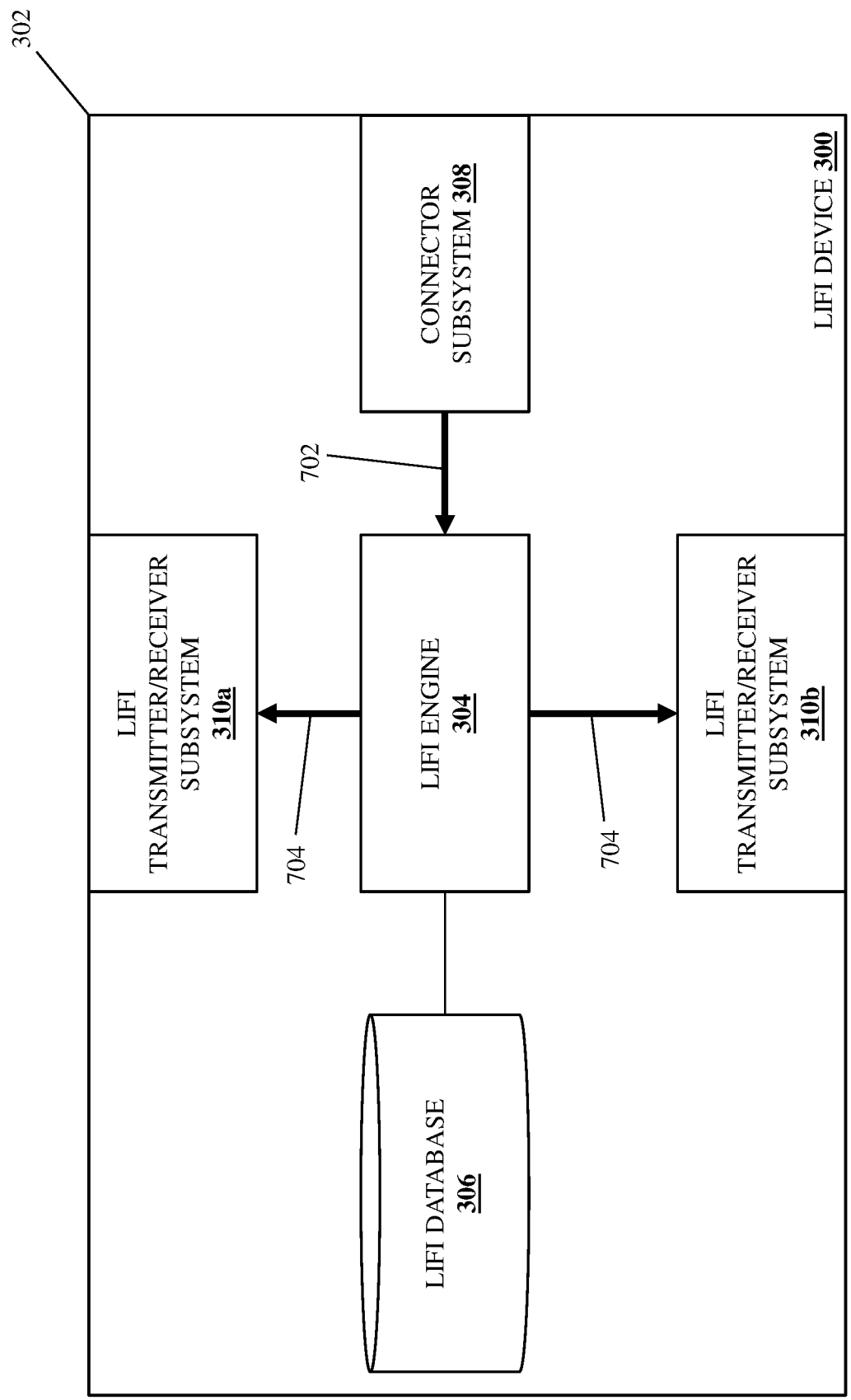
FIG. 7B is a schematic view illustrating the LiFi device of FIG. 3 operating during the method of FIG. 4.

However, while described as being received as analog electrical data communications, one of skill in the art in possession of the present disclosure will appreciate how the networking device stack configuration communications may be transmitted as digital electrical data communications, optical data communications, and/or other types of communications known in the art. As illustrated in FIG. 7B, the LiFi engine 304 in the LiFi device(s) 300 connected to the networking devices 200 may perform networking device stack configuration communication receiving operations 702 that include receiving the networking device stack configuration communications transmitted by the stacking engine 204 via their connector subsystems 308.

The LiFi engine 304 may then perform networking device stack configuration communication conversion operations that may include converting analog electrical data communications that were received via the connector subsystem 308 and that include the networking device stack configuration communications to digital electrical data communications that include the networking device stack configuration communications. However, similarly as discussed above, while the networking device stack configuration communications are described as being converted from analog electrical data communications to digital electrical data communications, one of skill in the art in possession of the present disclosure will appreciate how the networking device stack configuration communications may be received as digital electrical data communications, optical data communications, and/or other types of communications while remaining within the scope of the present disclosure.

With continued reference to FIG. 7B, the LiFi engine 304 may then perform networking device stack configuration communication transmission operations 704 that may include transmitting the networking device stack configuration communications via either or both of the LiFi transmitter/receiver subsystems 310a and 310b. For example, the LiFi transmitter/receiver subsystems 310a and/or 310b may receive the digital electrical data communications that include the networking device stack configuration communications, convert those digital electrical data communications to optical data communications that include the networking device stack configuration communications, and wirelessly transmit the optical data communications that include the networking device stack configuration communications using a LiFi transmitter (e.g., a laser LiFi transmitter for relatively higher throughput (e.g., up to 100 GbE), an LED LiFi transmitter when relatively higher throughput is not required, etc.). However, while the networking device stack configuration communications are described as being converted from digital electrical data communications to optical data communications, as discussed above some embodiments of the present disclosure may have the networking device stack configuration communications provided to the LiFi device 300 as optical data communications, and thus those optical data communications may be transmitted by the LiFi device 300 without the need to perform the conversion operations discussed above.

Figure 7C:
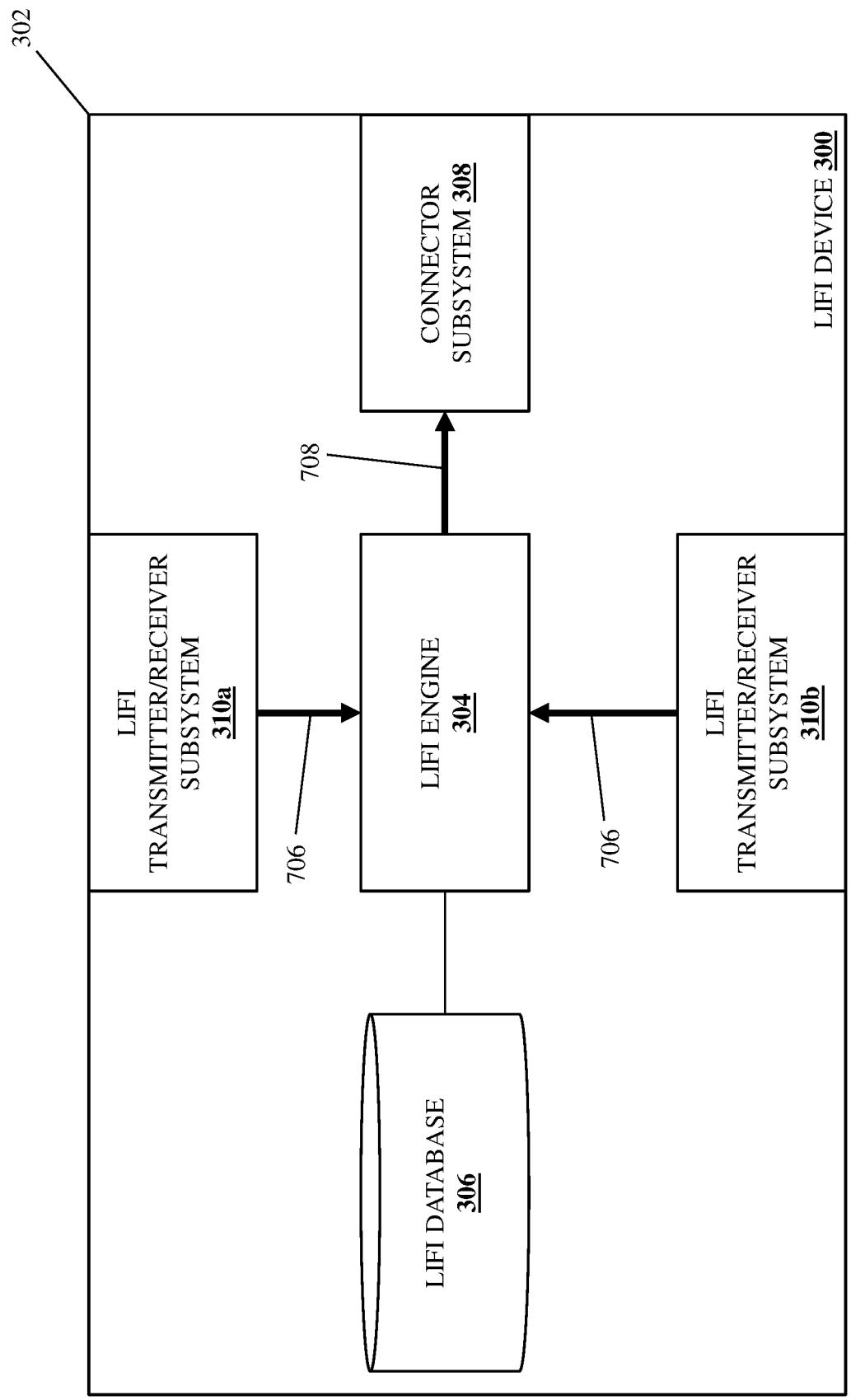
FIG. 7C is a schematic view illustrating the LiFi device of FIG. 3 operating during the method of FIG. 4.

To provide an example of the receiving of networking device stack configuration communications as part of the automated configuration of the networking devices 200a, 200b, and 200c to operate as part of a networking device stack, with reference to FIG. 7C, the LiFi engine 304 in the LiFi device(s) 300 connected to the networking devices 200 may perform networking device stack configuration communication receiving operations 706 that may include receiving the networking device stack configuration communications via either or both of the LiFi transmitter/receiver subsystems 310a and 310b. For example, the LiFi transmitter/receiver subsystems 310a and/or 310b may receive optical data communications that include the networking device stack configuration communications using a LiFi receiver (e.g., a laser LiFi receiver for relatively higher throughput (e.g., up to 100 GbE), an LED LiFi receiver when relatively higher throughput is not required, etc.).

The LiFi transmitter/receiver subsystems 310a and/or 310b may then convert those optical data communications to digital electrical data communications that include the networking device stack configuration communications, and transmit the digital electrical data communications that include the networking device stack configuration communications to the LiFi engine 304. However, while the networking device stack configuration communications are described as being converted from optical data communications to digital electrical data communications, one of skill in the art in possession of the present disclosure will appreciate how those optical data communications may be transmitted via the LiFi engine 304 to an optical-data-communication-enabled networking device without the need to perform the conversion operations discussed above.

The LiFi engine 304 may then perform networking device stack configuration communication conversion operations that may include converting digital electrical data communications that were received via the LiFi transmitter/receiver subsystems 310a and/or 310b and that include the networking device stack configuration communications to analog electrical data communications that include the networking device stack configuration communications. However, similarly as discussed above, while the networking device stack configuration communications are described as being converted from digital electrical data communications to analog electrical data communications, one of skill in the art in possession of the present disclosure will appreciate how the networking device stack configuration communications may be provided by the LiFi engine 304 to the networking device 200 as digital electrical data communications, optical data communications, and/or other types of communications while remaining within the scope of the present disclosure.

Figure 7D:
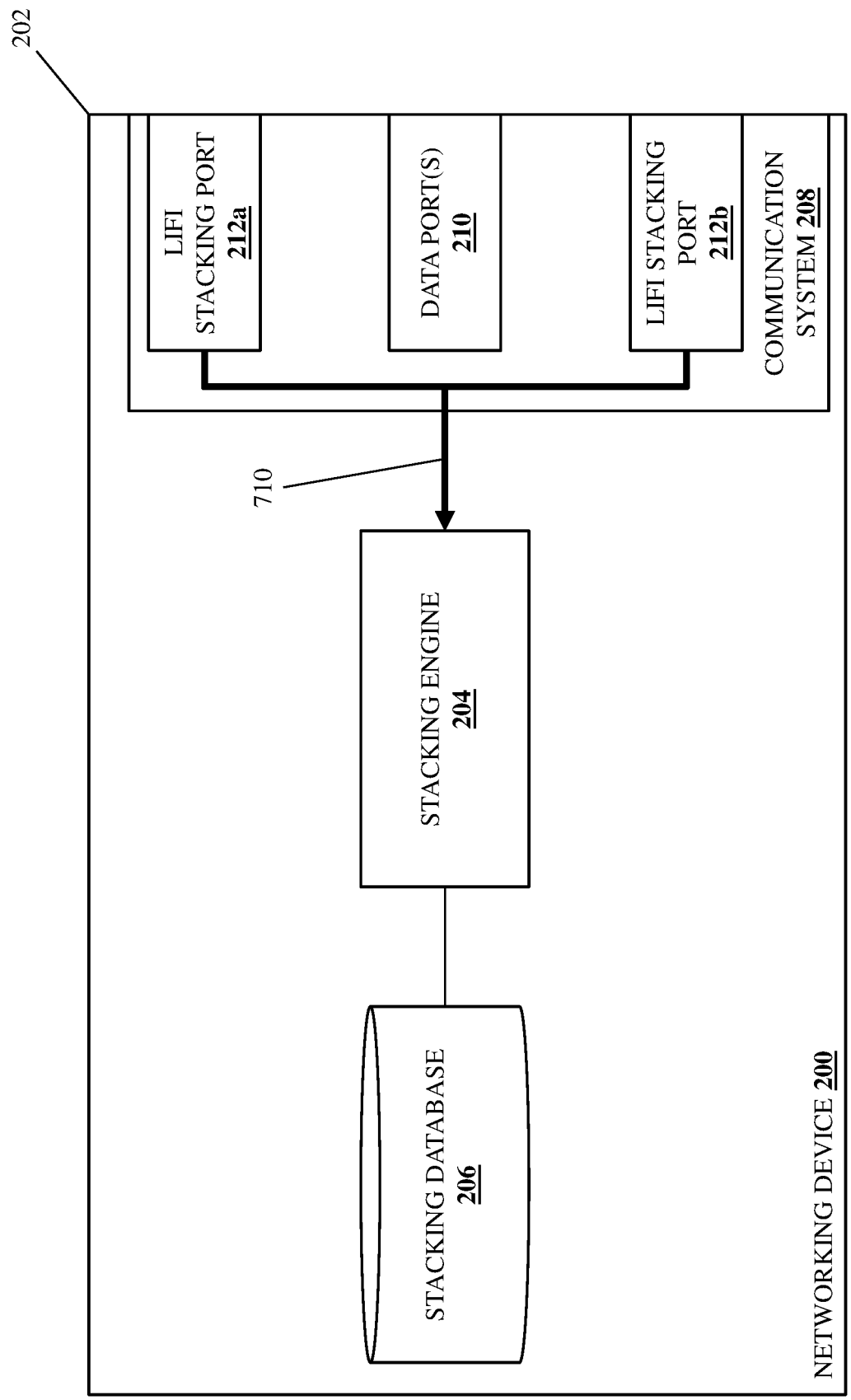
FIG. 7D is a schematic view illustrating an embodiment of the networking device of FIGS. 2A and 2B operating during the method of FIG. 4.

With reference back to FIG. 7C, the LiFi engine 304 in the LiFi device(s) 300 may perform networking device stack configuration communication transmission operations 708 that include transmitting the networking device stack configuration communications received from the LiFi transmitter/receiver subsystems 310a and/or 310b via the connector subsystem 308. With reference to FIG. 7D, the stacking engine 204 in the networking devices 200 (e.g., any for the networking devices 200a, 200b, and/or 200c) may perform networking device stack configuration communication receiving operations 710 that include receiving the networking device stack configuration communications from the LiFi device(s) 300 via either or both of the LiFi stacking ports 212a and 212b on that networking device 200.

Figure 7E:
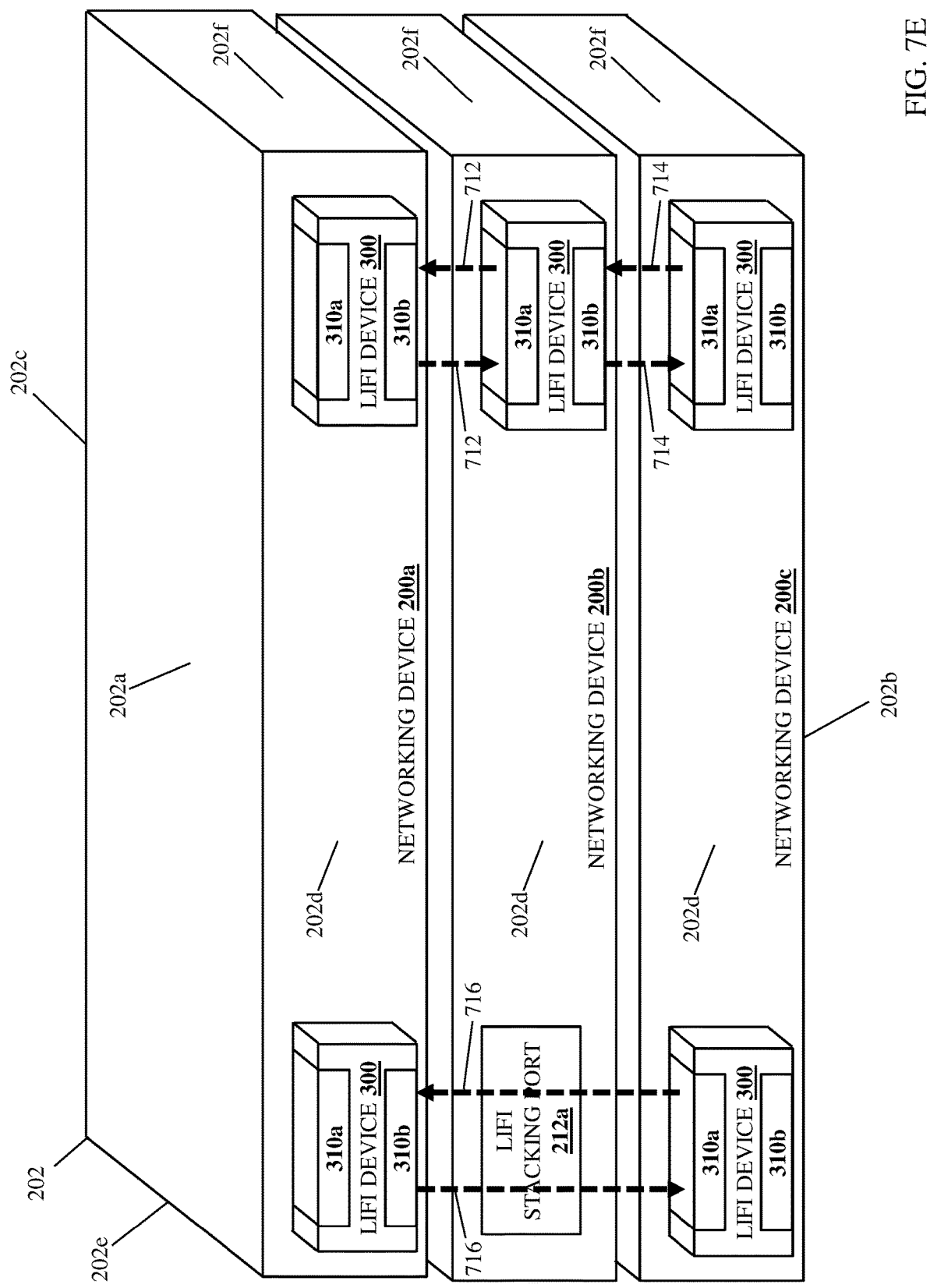
FIG. 7E is a perspective view illustrating an embodiment of the plurality of the LiFi devices and the networking devices in the networking device stack configuration of FIG. 6 and operating during the method of FIG. 4.

With reference to FIG. 7E, an embodiment of the transmission and receiving of the networking device stack configuration communications as part of the automated configuration of the networking devices 200a, 200b, and 200c to operate as part of a networking device stack as described above is illustrated. As illustrated, the LiFi device 300 connected to the LiFi stacking port 212b on the first networking device 200a may use its LiFi transmitter/receiver subsystem 310b to perform networking device stack configuration communication transmission/receiving operations 712 with the LiFi device 300 connected to the LiFi stacking port 212b on the second networking device 200b (i.e., using its LiFi transmitter/receiver subsystem 310a) in order to exchange point-to-point networking device stack configuration communications. Furthermore, the LiFi device 300 connected to the LiFi stacking port 212b on the second networking device 200b may use its LiFi transmitter/receiver subsystem 310b to perform networking device stack configuration communication transmission/receiving operations 714 with the LiFi device 300 connected to the LiFi stacking port 212b on the third networking device 200c (i.e., using its LiFi transmitter/receiver subsystem 310a) in order to exchange point-to-point networking device stack configuration communications. Further still, the LiFi device 300 connected to the LiFi stacking port 212a on the first networking device 200a may use its LiFi transmitter/receiver subsystem 310b to perform networking device stack configuration communication transmission/receiving operations 716 with the LiFi device 300 connected to the LiFi stacking port 212a on the third networking device 200c (i.e., using its LiFi transmitter/receiver subsystem 310a) in order to exchange point-to-point networking device stack configuration communications.

In some embodiments of the automated configuration of the networking devices 200a-200c to operate as part of the networking device stack, the stacking engines 204 in the networking devices 200a-200c may be configured to detect the LiFi device(s) 300 connected to the LiFi stacking ports 212a and/or 212b and, in response, determine that its networking device should be configured to operate as part of a networking device stack. As such, the connection of LiFi devices 300 to the LiFi stacking ports 212a and 212b on the networking devices 200a-200c may indicate to those networking devices 200a-200c that they should configure themselves to operate as part of a networking device stack.

In some embodiments, the number of LiFi devices 300 connected to a networking device may allow its stacking engine 204 to narrow down a relative location of that networking device in the networking device stack configuration (e.g., two LiFi devices 300 connected to a networking device may imply that networking device is located in a "top" networking device stack position or a "bottom" networking device stack position, while one LiFi device 300 connected to a networking device may imply that networking device is located in a "middle" networking device stack position). However, while the automated determination that a networking device should be configured to operate as part of a networking device stack in response to connected LiFi devices has been described, one of skill in the art in possession of the present disclosure will appreciate how a network administrator or other user may manually designate networking devices that should be configured to operate as part of a networking device stack while remaining within the scope of the present disclosure as well.

In some embodiments of the automated configuration of the networking devices 200a-200c to operate as part of the networking device stack, the stacking engines 204 in the networking devices 200a-200c may be configured to detect whether their networking device is connected to a management plane and, if so, may determine that networking device should be designated as a primary/management networking device for the networking device stack. As will be appreciated by one of skill in the art in possession of the present disclosure, the network administrator or other user may connect a networking device that they intend to operate as the primary/management networking device for the networking device stack to a management plane, and thus the detection of such management plane connectivity may be utilized to automatically identify that networking device as the primary/management networking device for the networking device stack. However, while the automated determination that a networking device should be configured to operate as a primary/management networking device in a networking device stack in response to management plane connectivity has been described, one of skill in the art in possession of the present disclosure will appreciate how a network administrator or other user may manually designate a networking device that should be configured to operate as a primary/management networking device for the networking device stack while remaining within the scope of the present disclosure as well.

In some embodiments of the automated configuration of the networking devices 200a-200c to operate as part of the networking device stack, the stacking engines 204 in the networking devices 200a-200c may be configured to elect which networking device should be designated as a stand-by networking device for a primary/management networking device in the networking device stack. As will be appreciated by one of skill in the art in possession of the present disclosure, any of a variety of election mechanisms (e.g., enabled by the networking device stack configuration communications) may be utilized to automatically elect a stand-by networking device for a primary/management networking device in the networking device stack. However, while the automated election of a networking device to operate as a stand-by networking device for a primary/management networking device in a networking device stack has been described, one of skill in the art in possession of the present disclosure will appreciate how a network administrator or other user may manually designate a stand-by networking device for a primary/management networking device in the networking device stack while remaining within the scope of the present disclosure as well.

As such, following the powering on, resetting, or other initialization of the networking device 200a, 200b, and 200c in the networking device stack configuration 500 with the LiFi devices 300 connected to those networking devices 200a-200c as illustrated in FIG. 6, each of the networking devices 200a-200c may determine that they should be configured to operate as part of a networking device stack, and one of those networking devices 200a-200c may determine that it should be configured as the primary/management networking device for the networking device stack. The networking devices 200a-200c may then exchange the networking device stack configuration communications as described above to configure the networking devices 200a-200c to operate as part of the networking device stack, configure one of those networking devices 200a-200c as the primary/management networking device for the networking device stack, and elect and configure another of those networking devices 200a-200c as the stand-by networking device for the primary/management networking device in the networking device stack.

As will be appreciated by one of skill in the art in possession of the present disclosure, the networking device stack configuration communications may also allow any of the LiFi devices to determine which of its LiFi transmitter/receiver subsystems 310a and 310b to utilize during the networking device stack configuration communications and subsequent networking device stack data communications (e.g., in embodiments in which the LiFi devices 300 include the pair of LiFi transmitter/receiver subsystems 310a and 310b on opposite sides of its chassis 302). For example, the LiFi devices 300 connected to the LiFi stacking ports 212a and 212b, respectively, on the first networking device 200a may determine that they should not utilize their LiFi transmitter/receiver subsystems 310a; the LiFi devices 300 connected to the LiFi stacking ports 212a and 212b, respectively, on the third networking device 200c may determine that they should not utilize their LiFi transmitter/receiver subsystems 310b; and the LiFi device 300 connected to the LiFi stacking port 212b on the second networking device 200b may determine that it should utilize both of its LiFi transmitter/receiver subsystems 310a and 310b.

Following block 406, the networking devices may be configured to operate as part of a networking device stack to transmit networking device stack data communications between each other (e.g., according to a stacking protocol that would be apparent to one of skill in the art in possession of the present disclosure). As discussed below, the method 400 may then proceed through blocks 408a, 410a, and 412a in order to allow the networking devices to transmit networking device stack data communications via their LiFi device(s), and/or may proceed through blocks 408b, 410b, and 412b in order to allow the networking devices to receive networking device stack data communications via their LiFi device(s). However, while the transmission of networking device stack data communications is described separately from the receiving of networking device stack data communications, one of skill in the art in possession of the present disclosure will appreciate how those operations may be performed in a different order, or simultaneously, while remaining within the scope of the present disclosure. Furthermore, while the networking device stack data communications are described below as being transmitted and/or received via the data port(s) 210 on the networking devices 200a-200c that is coupled to a computing device, one of skill in the art in possession of the present disclosure will appreciate how the networking device stack data communications may include management communications exchanged between the primary/management networking device and the other networking devices in the networking device stack (e.g., to propagate changes to the other networking devices in the networking device stack), as well as any other networking device stack data communications that would be apparent to one of skill in the art in possession of the present disclosure.

Figure 8A:
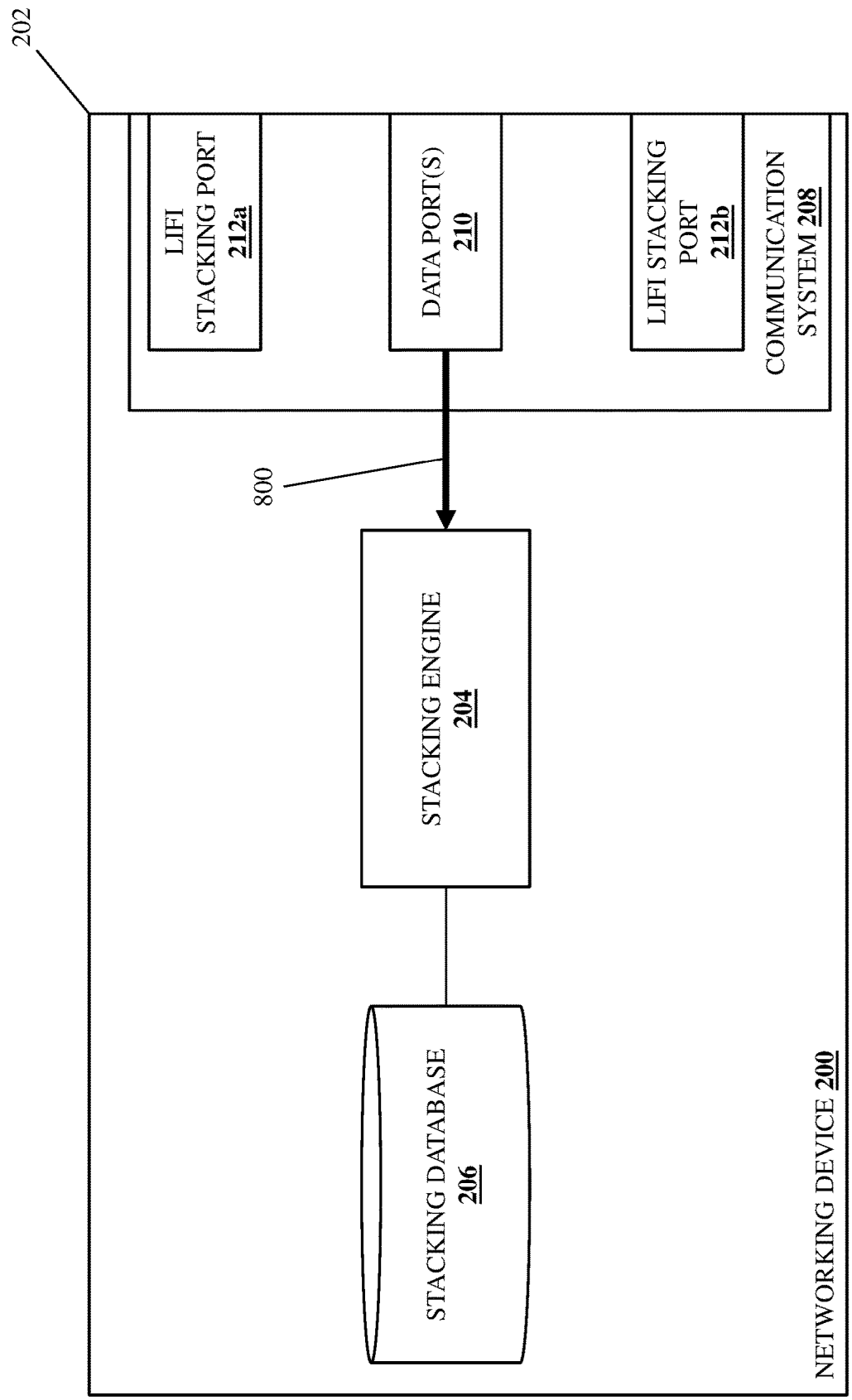
FIG. 8A is a schematic view illustrating an embodiment of the networking device of FIGS. 2A and 2B operating during the method of FIG. 4.

As such, in some embodiments and following block 406, the method 400 may then proceed to block 408a where the LiFi devices on the networking devices receive electrical data communications from those networking devices. With reference to FIG. 8A, in an embodiment of block 408a, the stacking engine 204 in the networking device 200 (e.g., which may be any for the networking devices 200a, 200b, and/or 200c) may perform host data communication receiving operations 800 that include receiving host data communications via the data port(s) 210 from a host device or other computing device connected to the data port(s) 210. In some of the specific examples provided below, the host data communications are provided by analog electrical data communications, although one of skill in the art in possession of the present disclosure will appreciate how the host data communications may be provided by digital electrical data communications, optical data communications, or other types of communications known in the art.

In an embodiment, in response to receiving the host data communications, the stacking engine 204 may determine that networking device stack data communications associated with those host data communications should be transmitted to at least one other networking device in the networking device stack. For example, the host data communications may be directed to a computing device that is directly connected to a different networking device in the networking device stack, and thus the networking device stack data communications may provide for the transmission of the host data communications to that computing device via its directly connected networking device (as well as any intermediate networking devices in the networking device stack). With reference to FIG. 8B, the stacking engine 204 may then perform networking device stack data communication transmission operations 802 that, in the illustrated embodiment, include transmitting networking device stack data communications that include the host data communications via the LiFi stacking port 212a on the networking device 200. As will be appreciated by one of skill in the art in possession of the present disclosure, the networking device stack data communications transmitted by the networking devices may be analog electrical data communications, although the transmission of digital electrical data communications or optical data communications will fall within the scope of the present disclosure as well.

Figure 8C:
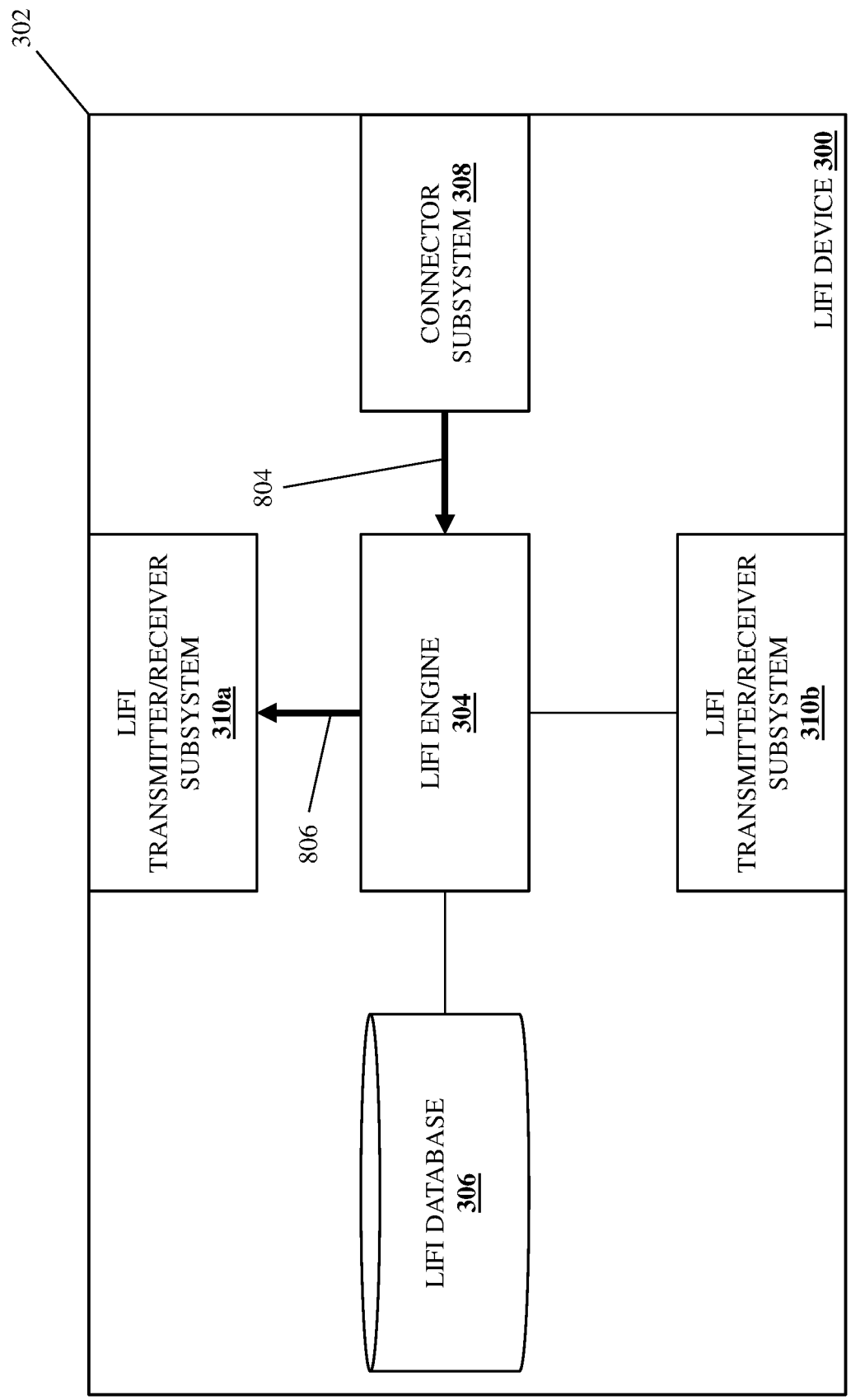
FIG. 8C is a schematic view illustrating the LiFi device of FIG. 3 operating during the method of FIG. 4.

As illustrated in FIG. 8C, in an embodiment of block 410a, the LiFi engine 304 in the LiFi device 300 connected to the LiFi stacking port 212a on networking device 200 may perform networking device stack data communication receiving operations 804 that include receiving the networking device stack data communications transmitted by the stacking engine 204 via its connector subsystem 308. However, while the transmission of networking device stack data communications by a stacking engine 204 and via the LiFi stacking port 212a to a LiFi device 300 connected thereto has been described, one of skill in the art in possession of the present disclosure will appreciate how any of the stacking engines 304 in any of the networking devices 200a, 200b, and/or 200c may transmit networking device stack data communications via either (or both) of the LiFi stacking ports 212a and/or 212b to connected LiFi devices 300 while remaining within the scope of the present disclosure as well.

The method 400 may then proceed to block 410a where the LiFi devices on the networking devices convert the electrical data communications to optical data communications. In an embodiment, at block 410a, the LiFi engine 304 may then perform networking device stack data communication conversion operations that may include converting analog electrical data communications that were received via the connector subsystem 308 and that include the networking device stack data communications to digital electrical data communications that include the networking device stack data communications. However, similarly as discussed above, while the networking device stack data communications are described as being converted from analog electrical data communications to digital electrical data communications, one of skill in the art in possession of the present disclosure will appreciate how the networking device stack data communications may be received as digital electrical data communications, optical data communications, and/or other types of communications while remaining within the scope of the present disclosure.

With continued reference to FIG. 8C, the LiFi engine 304 may then perform networking device stack configuration communication transmission operations 806 that may include transmitting the networking device stack data communications to the LiFi transmitter/receiver subsystems 310a. However, while the transmission of networking device stack data communications by a LiFi engine 304 to the LiFi transmitter/receiver subsystem 310a has been described, one of skill in the art in possession of the present disclosure will appreciate how the LiFi engine 304 may transmit networking device stack data communications to either (or both) of the LiFi transmitter/receiver subsystem 310a and/or 310b while remaining within the scope of the present disclosure as well.

In response to receiving the digital electrical data communications that include the networking device stack data communications, the LiFi transmitter/receiver subsystem 310a may convert those digital electrical data communications to optical data communications that include the networking device stack data communications. However, while the networking device stack data communications are described as being converted from digital electrical data communications to optical data communications, as discussed above some embodiments of the present disclosure may have the networking device stack data communications provided to the LiFi device 300 as optical data communications, and thus those optical data communications may be transmitted by the LiFi device 300 without the need to perform the conversion operations discussed above.

The method 400 may then proceed to block 412a where the LiFi devices on the networking devices wirelessly transmit the optical data communications to other LiFi devices on other networking devices. With continued reference to FIG. 8C, in an embodiment of block 412a, the LiFi engine 304 may perform networking device stack data communication transmission operations 806 that may include transmitting the networking device stack data communications via the LiFi transmitter/receiver subsystem 310a. For example, at block 412a the LiFi transmitter/receiver subsystem 310a may wirelessly transmit the optical data communications that include the networking device stack data communications using a LiFi transmitter (e.g., a laser LiFi transmitter for relatively higher throughput (e.g., up to 100 GbE), an LED LiFi transmitter when relatively higher throughput is not required, etc.), and one of skill in the art in possession of the present disclosure will appreciate how optical data communications that include the networking device stack data communications and that are wirelessly transmitted using the LiFi transmitter on a LiFi transmitter/receiver subsystem 310a of a LiFi device 300 will be wirelessly received via the LiFi receiver on a LiFi transmitter/receiver subsystem 310a of an adjacent LiFi device 300, as illustrated and discussed below with reference to FIG. 8G.

Figure 8D:
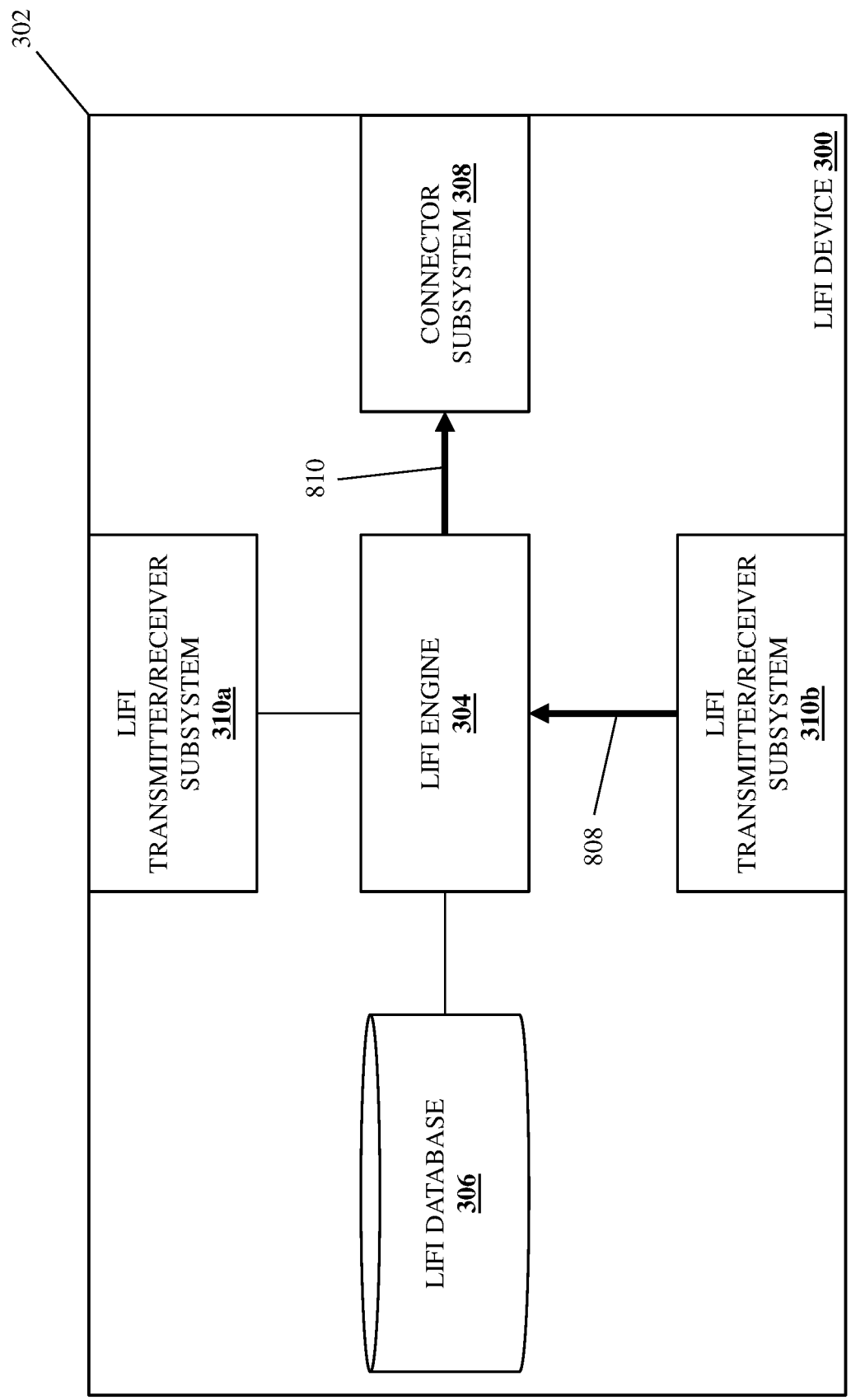
FIG. 8D is a schematic view illustrating the LiFi device of FIG. 3 operating during the method of FIG. 4.

In some embodiments and following block 406, the method 400 may proceed to block 408b where the LiFi devices on the networking devices wirelessly receive the optical data communications from other LiFi devices on other networking devices. With reference to FIG. 8D, in an embodiment of block 408b, the LiFi engine 304 in the LiFi device 300 connected to a networking devices 200 may perform networking device stack data communication receiving operations 808 that may include receiving the networking device stack data communications via the LiFi transmitter/receiver subsystem 310b. For example, the LiFi transmitter/receiver subsystems 310b may receive optical data communications that include the networking device stack data communications using a LiFi receiver (e.g., a laser LiFi receiver for relatively higher throughput (e.g., up to 100 GbE), an LED LiFi receiver when relatively higher throughput is not required, etc.).

The method 400 may then proceed to block 410b where the LiFi devices on the networking devices convert the optical data communications to electrical data communications. In an embodiment, at block 410b, the LiFi transmitter/receiver subsystem 310b may then convert the optical data communications to digital electrical data communications that include the networking device stack data communications, and transmit the digital electrical data communications that include the networking device stack data communications to the LiFi engine 304. However, while the networking device stack configuration communications are described as being converted from optical data communications to digital electrical data communications, one of skill in the art in possession of the present disclosure will appreciate how those optical data communications may be transmitted via the LiFi engine 304 to an optical-data-communication-enabled networking device without the need to perform the conversion operations discussed above.

The LiFi engine 304 may then perform networking device stack data communication conversion operations that may include converting digital electrical data communications that were received via the LiFi transmitter/receiver subsystem 310b and that include the networking device stack data communications to analog electrical data communications that include the networking device stack data communications. However, similarly as discussed above, while the networking device stack data communications are described as being converted from digital electrical data communications to analog electrical data communications, one of skill in the art in possession of the present disclosure will appreciate how the networking device stack data communications may be provided by the LiFi engine 304 to the networking device 200 as digital electrical data communications, optical data communications, and/or other types of communications while remaining within the scope of the present disclosure.

Figure 8E:
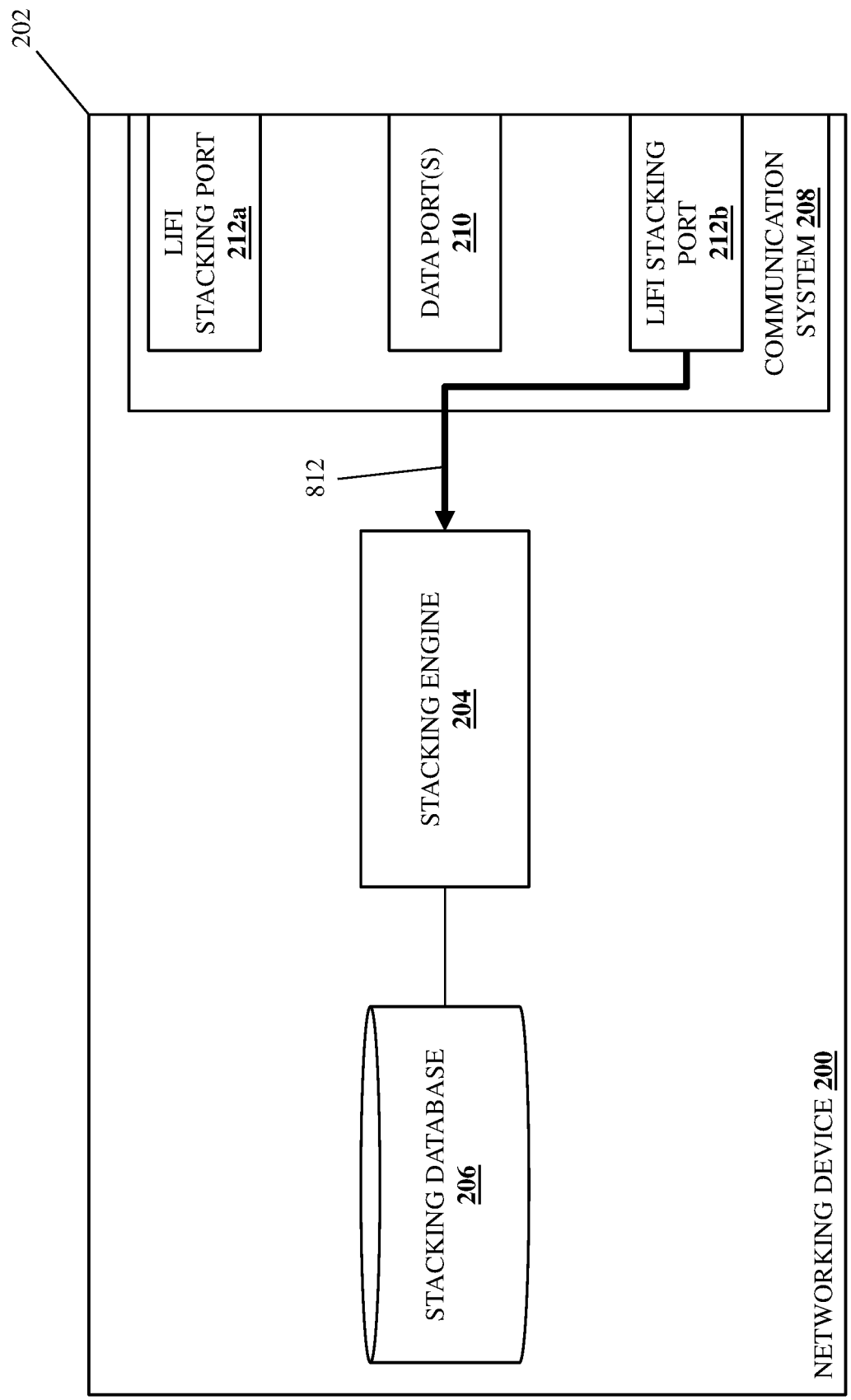
FIG. 8E is a schematic view illustrating an embodiment of the networking device of FIGS. 2A and 2B operating during the method of FIG. 4.
Figure 8F:
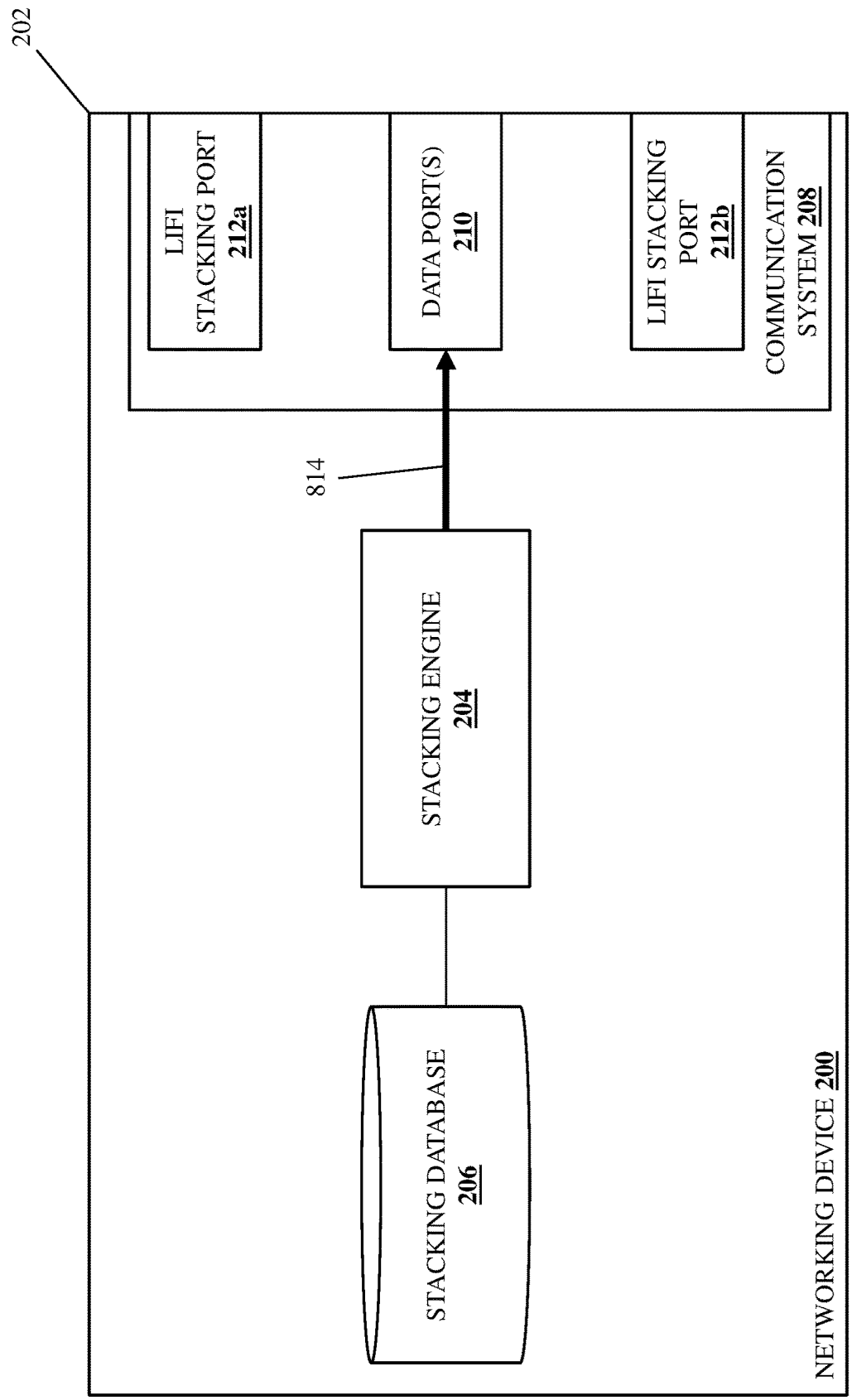
FIG. 8F is a schematic view illustrating an embodiment of the networking device of FIGS. 2A and 2B operating during the method of FIG. 4.

The method 400 may then proceed to block 412b where the LiFi devices on the networking devices transmit the electrical data communications to those networking devices. With reference back to FIG. 8D, in an embodiment of block 412b, the LiFi engine 304 in the LiFi device(s) 300 may perform networking device stack data communication transmission operations 810 that include transmitting the networking device stack data communications, which were received from the LiFi transmitter/receiver subsystem 310b and converted as discussed above, via the connector subsystem 308. With reference to FIG. 8E, the stacking engine 204 in the networking device 200 (e.g., which may be any for the networking devices 200a, 200b, and/or 200c) may perform networking device stack data communication receiving operations 812 that include receiving the networking device stack data communications from the LiFi device 300 via the LiFi stacking port 212b on that networking device 200. With reference to FIG. 8F, the stacking engine 204 may then perform networking device stack data communication transmission operations 814 that include transmitting the networking device stack data communications via the data port(s) 210 to computing device(s) connected thereto.

Figure 8G:
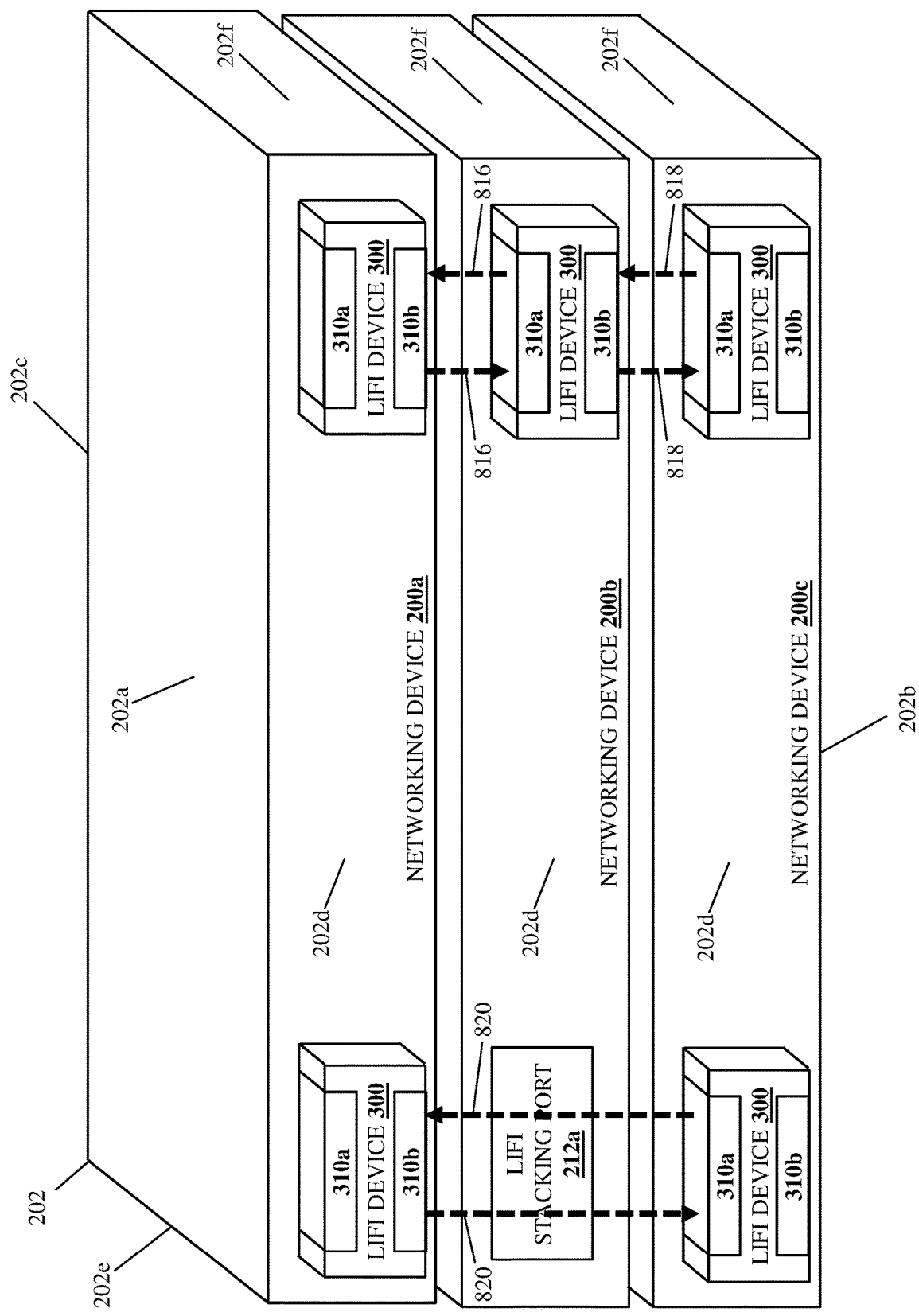
FIG. 8G is a perspective view illustrating an embodiment of the plurality of the LiFi devices and the networking devices in the networking device stack configuration of FIG. 6 and operating during the method of FIG. 4

With reference to FIG. 8G, an embodiment of the transmission and receiving of the networking device stack data communications by the networking devices 200a, 200b, and 200c while operating as part of a networking device stack as described above is illustrated. As illustrated, the LiFi device 300 connected to the LiFi stacking port 212b on the first networking device 200a may use its LiFi transmitter/receiver subsystem 310b to perform networking device stack data communication transmission/receiving operations 816 with the LiFi device 300 connected to the LiFi stacking port 212b on the second networking device 200b (i.e., using its LiFi transmitter/receiver subsystem 310a) in order to exchange point-to-point networking device stack data communications. Furthermore, the LiFi device 300 connected to the LiFi stacking port 212b on the second networking device 200b may use its LiFi transmitter/receiver subsystem 310b to perform networking device stack configuration communication transmission/receiving operations 818 with the LiFi device 300 connected to the LiFi stacking port 212b on the third networking device 200c (i.e., using its LiFi transmitter/receiver subsystem 310a) in order to exchange point-to-point networking device stack data communications. Further still, the LiFi device 300 connected to the LiFi stacking port 212a on the first networking device 200a may use its LiFi transmitter/receiver subsystem 310b to perform networking device stack configuration communication transmission/receiving operations 820 with the LiFi device 300 connected to the LiFi stacking port 212a on the third networking device 200c (i.e., using its LiFi transmitter/receiver subsystem 310a) in order to exchange point-to-point networking device stack data communications.

As such, one of skill in the art in possession of the present disclosure will appreciate how networking device stack data communications such as, for example, data traffic transmitted by any computing device directly coupled to one of the networking devices 200a-200c in the networking device stack, may be routed to another computing device directly coupled to another of the networking devices 200a-200c in the networking device stack. Furthermore, one of skill in the art in possession of the present disclosure will appreciate how networking device stack data communications such as, for example, management traffic transmitted by the primary/management networking device included in the networking devices 200a-200c in the networking device stack, may be routed to any of the other networking devices 200a-200c in the networking device stack.

Thus, systems and methods have been described that provide for the exchange of networking device stack data communications between networking devices in a networking device stack via the use of LiFi devices that transmit those networking device stack data communications using light and without the need for cables. For example, the cable free networking device stacking system of the present disclosure may include networking devices that are each configured to operate as part of a networking device stack, and at least one LiFi device included on each of the networking devices. A first LiFi device on a first networking device in the plurality of networking devices transmits networking device stack data communications by receiving first electrical data communications from the first networking device, converting the first electrical data communications to first optical data communications, and wirelessly transmitting the first optical data communications to a second LiFi device included on a second networking device in the plurality of networking devices. The first LiFi device also receives networking device stack data communications by wirelessly receiving second optical data communications from the second LiFi device, converting the second optical data communications to second electrical data communications, and transmitting the second electrical data communications to the first networking device. As such, issues with conventional cabled networking device stacking systems are eliminated.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A cable free networking device stacking system, comprising:
   a plurality of networking devices; and
   at least one LiFi device included on each of the plurality of networking devices, wherein a first LiFi device included on a first networking device in the plurality of networking devices is configured to transmit networking device stack data communications by:
      receiving first electrical data communications from the first networking device;
      converting the first electrical data communications to first optical data communications; and
      wirelessly transmitting the first optical data communications to a second LiFi device included on a second networking device in the plurality of networking devices, and
   wherein each of the plurality of networking devices is configured to:
      exchange, using the at least one LiFi device included on that networking device, networking device stack configuration communications with a subset of the plurality of networking devices via the at least one LiFi device included on each of those networking device; and
      automatically configure, based on the networking device stack configuration communications, that networking device to operate as part of a networking device stack.

2. The system of claim 1, wherein the first LiFi device included on the first networking device is configured to transmit the networking device stack data communications by:
   wirelessly receiving second optical data communications from the second LiFi device included on the second networking device;
   converting the second optical data communications to second electrical data communications; and
   transmitting the second electrical data communications to the first networking device.

3. The system of claim 1, wherein the first LiFi device included on the first networking device is configured to transmit the networking device stack data communications by:
   receiving second electrical data communications from the first networking device;
   converting the second electrical data communications to second optical data communications; and
   wirelessly transmitting the second optical data communications to a third LiFi device included on a third networking device in the plurality of networking devices.

4. The system of claim 3, wherein the first LiFi device included on the first networking device is configured to transmit the networking device stack data communications by:
   wirelessly receiving third optical data communications from the third LiFi device included on the third networking device;
   converting the third optical data communications to third electrical data communications; and
   transmitting the third electrical data communications to the first networking device.

5. The system of claim 1, wherein each of the LiFi devices includes a laser LiFi transmitter and a laser LiFi receiver.

6. The system of claim 1, wherein each of the LiFi devices includes a chassis having a first LiFi transmitter/receiver located on a first side of the chassis and a second LiFi transmitter/receiver located on a second side of the chassis that is opposite the chassis from the first side.

7. The system of claim 1, wherein each of the plurality of networking devices is configured to:
   eliminate at least one networking device stack position of that networking device in the networking device stack based on a number of the at least one LiFi device included on that networking device.

8. An Information Handling System (IHS), comprising:
   a networking processing system; and
   a networking memory system that is coupled to the networking processing system and that includes instructions that, when executed by the networking processing system, cause the networking processing system to provide a networking engine that is configured to:
      receive, from a computing device that is coupled to the networking processing system, first electrical data communications; and
      transmit the first electrical data communications as part of networking device stack communication operations; and
   a LiFi processing system that is coupled to the networking processing system; and
   a LiFi memory system that is coupled to the LiFi processing system and that includes instructions that, when executed by the LiFi processing system, cause the LiFi processing system to provide a LiFi engine that is configured to transmit networking device stack data communications by:
      receive the first electrical data communications transmitted by the networking engine;
      convert the first electrical data communications to first optical data communications; and
      wirelessly transmit the first optical data communications, and
   wherein the networking engine is configured to:
      exchange, using the LiFi engine, networking device stack configuration communications with a subset of a plurality of networking devices via at least one LiFi device included on each of the subset of the plurality of networking devices; and
      automatically configure, based on the networking device stack configuration communications, the networking engine to operate as part of a networking device stack that includes the plurality of networking devices.

9. The IHS of claim 8, wherein the LiFi engine is configured to transmit the networking device stack data communications by:
   wirelessly receiving second optical data communications from the second LiFi device included on the second networking device;
   converting the second optical data communications to second electrical data communications; and
   transmitting the second electrical data communications to the networking engine.

10. The IHS of claim 8, wherein the LiFi engine is configured to transmit the networking device stack data communications by:
   receiving second electrical data communications from the networking engine;
   converting the second electrical data communications to second optical data communications; and
   wirelessly transmitting the second optical data communications to a third LiFi device included on a third networking device that is configured to operate as part of the networking device stack.

11. The IHS of claim 10, wherein the LiFi engine is configured to transmit the networking device stack data communications by:
   wirelessly receiving third optical data communications from the third LiFi device included on the third networking device;
   converting the third optical data communications to third electrical data communications; and
   transmitting the third electrical data communications to the networking engine.

12. The IHS of claim 8, wherein the LiFi engine is configured to wirelessly transmit the first optical data communications using a laser LiFi transmitter.

13. The IHS of claim 8, wherein LiFi engine is configured to wirelessly transmit the first optical data communications using either of a first LiFi transmitter that is located on a first side of a chassis that houses the LiFi processing system and the LiFi memory system, or a second LiFi transmitter that is located on a second side of the chassis that is opposite the chassis from the first side.

14. A method for stacking networking devices without the use of cables, comprising:
   exchanging, by each of a plurality of networking devices using at least one LiFi device included on that networking device, networking device stack configuration communications with a subset of the plurality of networking devices via the at least one LiFi device included on each of those networking device;
   automatically configuring, by each of the plurality of networking devices based on the networking device stack configuration communications, that networking device to operate as part of a networking device stack;
   receiving, by a first LiFi device included on a first networking device included in the plurality of networking devices, first electrical data communications from the first networking device as part of networking device stack communication operations performed by the first networking device;
   converting, by the first LiFi device, the first electrical data communications to first optical data communications; and
   wirelessly transmitting, by the first LiFi device, the first optical data communications to a second LiFi device included on a second networking device that is included in the plurality of networking devices.

15. The method of claim 14, further comprising:
   wirelessly receiving, by the first LiFi device, second optical data communications from the second LiFi device included on the second networking device;
   converting, by the first LiFi device, the second optical data communications to second electrical data communications; and
   transmitting, by the first LiFi device, the second electrical data communications to the first networking device.

16. The method of claim 14, further comprising:
   receiving, by the first LiFi device, second electrical data communications from the first networking device as part of the networking device stack communication operations performed by the first networking device;
   converting, by the first LiFi device, the second electrical data communications to second optical data communications; and
   wirelessly transmitting, by the first LiFi device, the second optical data communications to a third LiFi device included on a third networking device in the plurality of networking devices.

17. The method of claim 16, further comprising:
   wirelessly receiving, by the first LiFi device, third optical data communications from the third LiFi device included on the third networking device;
   converting, by the first LiFi device, the third optical data communications to third electrical data communications; and
   transmitting, by the first LiFi device, the third electrical data communications to the first networking device.

18. The method of claim 14, further comprising:
   wirelessly transmitting, by the first LiFi device, the first optical data communications using a laser LiFi transmitter.

19. The method of claim 14, further comprising:
   wirelessly transmitting, by the first LiFi device, the first optical data communications using either of a first LiFi transmitter that is located on a first side of a chassis of the first LiFi device, or a second LiFi transmitter that is located on a second side of the chassis that is opposite the chassis from the first side.

20. The method of claim 14, further comprising:
   eliminating, by each of the plurality of networking devices, at least one networking device stack position of that networking device in the networking device stack based on a number of the at least one LiFi device included on that networking device.

* * * * *